US011310702B2

(12) United States Patent
Mohamed et al.

(10) Patent No.: US 11,310,702 B2
(45) Date of Patent: Apr. 19, 2022

(54) NETWORK-INITIATED HANDOVER IN INTEGRATED SMALL CELL AND WIFI NETWORKS

(71) Applicant: Convida Wireless, LLC, Wilmington, DE (US)

(72) Inventors: Ahmed Mohamed, Miramar, FL (US); John L. Tomici, Southold, NY (US); Qing Li, Princeton Junction, NJ (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/908,848

(22) Filed: Jun. 23, 2020

(65) Prior Publication Data
US 2020/0322852 A1 Oct. 8, 2020

Related U.S. Application Data

(63) Continuation of application No. 16/244,400, filed on Jan. 10, 2019, now Pat. No. 10,764,792, which is a (Continued)

(51) Int. Cl.
*H04W 36/00* (2009.01)
*H04W 36/14* (2009.01)
(Continued)

(52) U.S. Cl.
CPC .... *H04W 36/0022* (2013.01); *H04W 36/0011* (2013.01); *H04W 36/14* (2013.01);
(Continued)

(58) Field of Classification Search
CPC .......... H04W 36/0022; H04W 36/18; H04W 36/385; H04W 36/0011; H04W 36/14;
(Continued)

(56) References Cited

U.S. PATENT DOCUMENTS

2008/0205345 A1* 8/2008 Sachs ............... H04W 36/0011
370/332
2009/0075648 A1* 3/2009 Reed .................. H04L 41/0823
455/424
(Continued)

FOREIGN PATENT DOCUMENTS

JP 2014-506747 A 3/2014
WO 2014/107358 A1 7/2014

OTHER PUBLICATIONS

ETRI: "SAE Deployment scenarios for separate MME", 3GPP Draft: S2-063898, 3rd Generation Partnership Project (3GPP), Mobile Competence Centre; 650, Route DES Lucioles; F-06921 Sophia-Antipolis Cedex; France, vol. SA WG2, No. Busan; Oct. 17, 2006, Oct. 17, 2006 (Oct. 17, 2006), XP050257699, [retrieved on Oct. 17, 2006] the whole document.
(Continued)

*Primary Examiner* — Inder P Mehra
(74) *Attorney, Agent, or Firm* — BakerHostetler

(57) ABSTRACT

Applicants disclose an inter-system mobility anchor control point that is adapted to initiate handover of an existing communication connection in an integrated small cell and WiFi (ISW) network. The inter-system mobility anchor control point is communicatively coupled to both an HeNB/LTE network and trusted WLAN access network (TWAN) and adapted to operate as a common control plane entity for both HeNB/LTE and TWAN access. The mobility anchor control point may be a mobility management entity (MME) or an integrated small cell and WLAN gateway (ISW GW). The mobility anchor control point is adapted to request and receive measurement data relating to the operations of the HeNB network and WLAN. Based upon the measurement data, the mobility anchor control point determines whether an existing communication path via one of the HeNB/LTE
(Continued)

network and WLAN should be handed over to the other of the networks.

6 Claims, 26 Drawing Sheets

Related U.S. Application Data continuation of application No. 15/325,746, filed as application No. PCT/US2015/040355 on Jul. 14, 2015.

(60) Provisional application No. 62/024,276, filed on Jul. 14, 2014.

(51) Int. Cl.

| *H04W 36/18* | (2009.01) |
|---|---|
| *H04W 36/38* | (2009.01) |
| *H04W 84/04* | (2009.01) |
| *H04W 84/12* | (2009.01) |
| *H04W 84/16* | (2009.01) |
| *H04W 92/06* | (2009.01) |
| *H04W 88/16* | (2009.01) |

(52) U.S. Cl.
CPC ......... *H04W 36/18* (2013.01); *H04W 36/385* (2013.01); *H04W 84/045* (2013.01); *H04W 84/12* (2013.01); *H04W 88/16* (2013.01); *H04W 92/06* (2013.01)

(58) Field of Classification Search
CPC ... H04W 84/045; H04W 84/12; H04W 88/16; H04W 92/06
USPC .......................................................... 455/438
See application file for complete search history.

(56) References Cited

U.S. PATENT DOCUMENTS

| 2009/0219894 | A1* | 9/2009 | Jee .................... H04W 36/0061 370/332 |
|---|---|---|---|
| 2010/0009674 | A1* | 1/2010 | Sapkota .............. H04L 65/1093 455/426.1 |
| 2010/0054207 | A1* | 3/2010 | Gupta ................... H04W 36/14 370/331 |
| 2010/0226339 | A1 | 9/2010 | Stephenson et al. |
| 2011/0058531 | A1 | 3/2011 | Jain et al. |
| 2011/0296125 | A1 | 12/2011 | Shaikh et al. |
| 2013/0294327 | A1 | 11/2013 | Horn et al. |
| 2014/0177600 | A1 | 6/2014 | Tsai et al. |
| 2014/0233386 | A1 | 8/2014 | Jamadagni et al. |
| 2015/0208310 | A1 | 7/2015 | Taneja et al. |
| 2016/0050605 | A1* | 2/2016 | Kim ..................... H04W 28/08 370/331 |
| 2016/0080958 | A1* | 3/2016 | Rinne ................... H04W 24/10 370/338 |
| 2016/0127964 | A1* | 5/2016 | Roeland ................ H04W 36/30 370/332 |
| 2016/0165518 | A1 | 6/2016 | Keller et al. |
| 2017/0164245 | A1 | 6/2017 | Chai et al. |

OTHER PUBLICATIONS

3GPP TS 36.331 V12.1.0, Technical Specification, 3rd Generation Partnership Project; Technical Specification Group Radio Access Network; Evolved Universal Terrestrial Radio Access (E-UTRA); Radio Resource Control (RRC); Protocol Specification (Release 12), Mar. 2014, 304 pages.

3rd Generation Partnership Project (3GPP), Technical Specification Group Services and System Aspects; Architecture Enhancements for non-3GPP Accesses (Release 12) (online), 3GPP TS 23.402, Jun. 20, 2014, V12.5.0, p. 204-219.

3rd Generation Partnership Project (3GPP), TR 23.852 V12.0.0, "Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG)"; Stage 2 (Release 12), Sep. 2013, 1-157 pages.

3rd Generation Partnership Project; (3GPP) TR 37.834 V12.0.0 3rd Generation Partnership Project; Technical Specification Group Radio Access Network; Study on Wireless Local Area Network (WLAN)—3GPP radio interworking (Release 12), Dec. 2013, 17 pages.

3rd Generation Partnership Project; (3GPP) TS 23.401 V12.4.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), Mar. 2014, 302 pages.

3rd Generation Partnership Project; (3GPP) TS 23.402 V12.4.0 3rd Generation Partnership Project; Technical Specification Group Services and System Aspects; Architecture enhancements for non-3GPP accesses (Release 12), Mar. 2014, 288 pages.

3rd Generation Partnership Project; (3GPP) TS 24.244 V1.1.0 3rd Generation Partnership Project; Technical Specification Group Core Network and Terminals; Wireless LAN control plane protocol for trusted WLAN access to EPC; Stage 3 (Release 12), Apr. 2014, 32 pages.

3rd Generation Partnership Project; (3GPP) TS 29.274 V12.4.0 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Mar. 2014, 245 pages.

Ferrus et al, "Interworking in Heterogeneous Wireless Networks: Comprehensive Framework and Future Trends", IEEE Wireless Cimmunications, Apr. 2010, pp. 22-31.

Tomici et al, "Integrated Small Cell and Wi-Fi Networks" 2015 IEEE Wireless Communications and Networking Conference (WCNC):—Track 3: Mobile and Wireless Networks, 2015, pp. 1261-1266.

www.netmanias.com techdocs 5907 Netmanisas Analyze Tredns, Technologies and Market, 2002-2017, 3 pages.

\* cited by examiner

For better connectivity service, the Mobile Service Provider will switch your connection to another access network (LTE or WiFi)

Acknowledge

FIG. 10A

For better connectivity service, it is advised that the Mobile Service Provider switch your connection to another access network (LTE or WiFi)

Agree    Disagree

FIG. 10B

NETWORK-INITIATED HANDOVER IN INTEGRATED SMALL CELL AND WIFI NETWORKS

CROSS REFERENCE TO RELATED APPLICATIONS

This application is a continuation of U.S. application Ser. No. 16/244,400 filed Jan. 10, 2019 which is a continuation of U.S. application Ser. No. 15/325,746 filed on Jan. 12, 2017, which is a National Stage Application filed under 35 U.S.C. 371 of International Application No. PCT/US2015/040355 filed Jul. 14, 2015, which claims benefit under 35 U.S.C. § 119(e) of Provisional U.S. patent application 62/024,276 filed on Jul. 14, 2014, the contents of which are hereby incorporated herein by reference in their entirety.

BACKGROUND

As wireless communications technologies have evolved, additional demands have been placed on wireless systems to support more extensive use of diverse wireless networks. Mobile network operators (MNOs) have begun incorporating "carrier-grade" WiFi in ways that complement their cellular and core network services. For instance, MNOs have sought to employ WiFi to offload Internet traffic from their cellular and core networks. MNOs have also sought to provide users of WiFi networks with access to the evolved packet core (EPC) of cellular systems.

While demand continues to increase for inter-system integration of cellular and WiFi networks, existing methods of providing such integration have proven to be resource intensive and too often result in interruptions in ongoing communications.

SUMMARY

Applicants disclose systems and methods for network-initiated handover in integrated small cell and WiFi (ISW) networks.

In an example embodiment, an inter-system mobility anchor control point is communicatively coupled to both an HeNB/LTE network and trusted WLAN access network (TWAN) and adapted to operate as a common control plane entity for both HeNB/LTE and TWAN access. The inter-system mobility anchor control point allows for user equipment (UE) to access the capabilities of a packet data network (PDN) through either the HeNB/LTE access network or TWAN. The inter-system mobility anchor control point is programmed to monitor and analyze data regarding HeNB and WLAN operations and, when appropriate, to initiate a handover of an existing communication connection between a UE and a PDN from one of the LTE access network or TWAN to the other.

In an example embodiment, the inter-system mobility anchor control point may be a mobility management entity (MME). A control plane interface, referred to as the S1a-MME or S1a-C interface, is defined between a trusted WLAN access network (TWAN) and the MME communicatively coupled with an LTE wireless access network. A user plane interface, referred to as the S1a-U interface, is defined between the TWAN and a serving gateway (SGW). The MME operates as a common control plane entity for both LTE and TWAN access, while the SGW operates as a user plane gateway for both LTE and TWAN.

The MME is programmed to initiate a handover of an existing communication connection between a UE and a PDN from one of the LTE access network or TWAN to the other. In an example scenario, a UE may have an existing connection to a PDN from one of the LTE access network and the TWAN. The MME is programmed to request and receive data regarding the status of the LTE access network and TWAN network. For example, the MME may receive measurements relating to the operations of the LTE access network and TWAN network. The MME processes the received data and determines that a handover of the communication path should be made from the existing connection via one of the LTE access network and TWAN to the other. For example, the MME may determine that the LTE access network is overused and that an existing connection through the LTE access network should be handed over to the WLAN. The MME coordinates the handover between the elements of the core network, the HeNB/LTE access network and the TWAN. In an example scenario, the MME instructs the one of the LTE access network and TWAN that has an existing connection to perform a handover. The one of the LTE access network and TWAN that has an existing connection notifies the UE to perform a handover. The UE attaches to the one of the LTE access network and TWAN that does not currently have a connection to the PDN. The MME coordinates with the SGW to switch the data flow from the one of the LTE access network and TWAN that had the previously existing connection to the other. The MME coordinates a release of the network resources by the one of the LTE access network and TWAN that had a previously existing connection to the PDN. The data may then flow between the UE and the PDN using the newly established connection.

In an example embodiment, the inter-system mobility anchor control point may alternatively be an integrated small cell and wireless local area network (ISW) gateway (GW) that is integrated with a mobility management entity (MME) and serving gateway (SGW) and has interfaces with both an HeNB/LTE access network and a TWAN. The ISW GW operates as both a common control gateway and a common user gateway for both LTE access networks and TWANs. The ISW GW receives control plane communications from both the LTE access network and TWAN and forwards the communications to the MME which operates as a common control plane for both LTE and TWAN access. Similarly, the ISW GW receives user plane communications from both the LTE access network and TWAN and forwards the communications to the SGW which operates as a common user plane for both the LTE access network and TWAN.

The ISW GW is programmed to initiate a handover of an existing communication connection between a UE and a PDN from one of the LTE access network or TWAN to the other. In an example scenario, a UE may have an existing connection to a PDN from one of the LTE access network and the TWAN. The ISW GW is programmed to request and receive data regarding the status of the LTE access network and TWAN network. For example, the ISW GW may receive measurements relating to the operations of the LTE access network and TWAN network. The ISW GW processes the received data and determines that a handover of the communication path should be made from the existing connection via one of the LTE access network and TWAN to the other. For example, the ISW GW may determine that the LTE access network is overused and that an existing connection through the LTE access network should be handed over to the WLAN. The ISW GW coordinates the handover. In an example scenario, the ISW GW instructs the one of the LTE access network and TWAN that has an existing connection to perform a handover. The one of the LTE access network and TWAN that has an existing connection notifies the UE to perform a handover. The UE attaches to the one of the LTE access network and TWAN that does not currently have a connection to the PDN. The ISW GW switches the data flow from the one of the LTE access network and TWAN to the other. The ISW GW coordinates a release of the network resources by the one of the LTE access network and TWAN that had a previously existing connection to the PDN. The data may then flow between the UE and the PDN using the newly established connection.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

FIGS. 10A-B depict example user interfaces that may be presented by a UE during handover of a connection.

DETAILED DESCRIPTION OF ILLUSTRATIVE EMBODIMENTS

Figure 1:
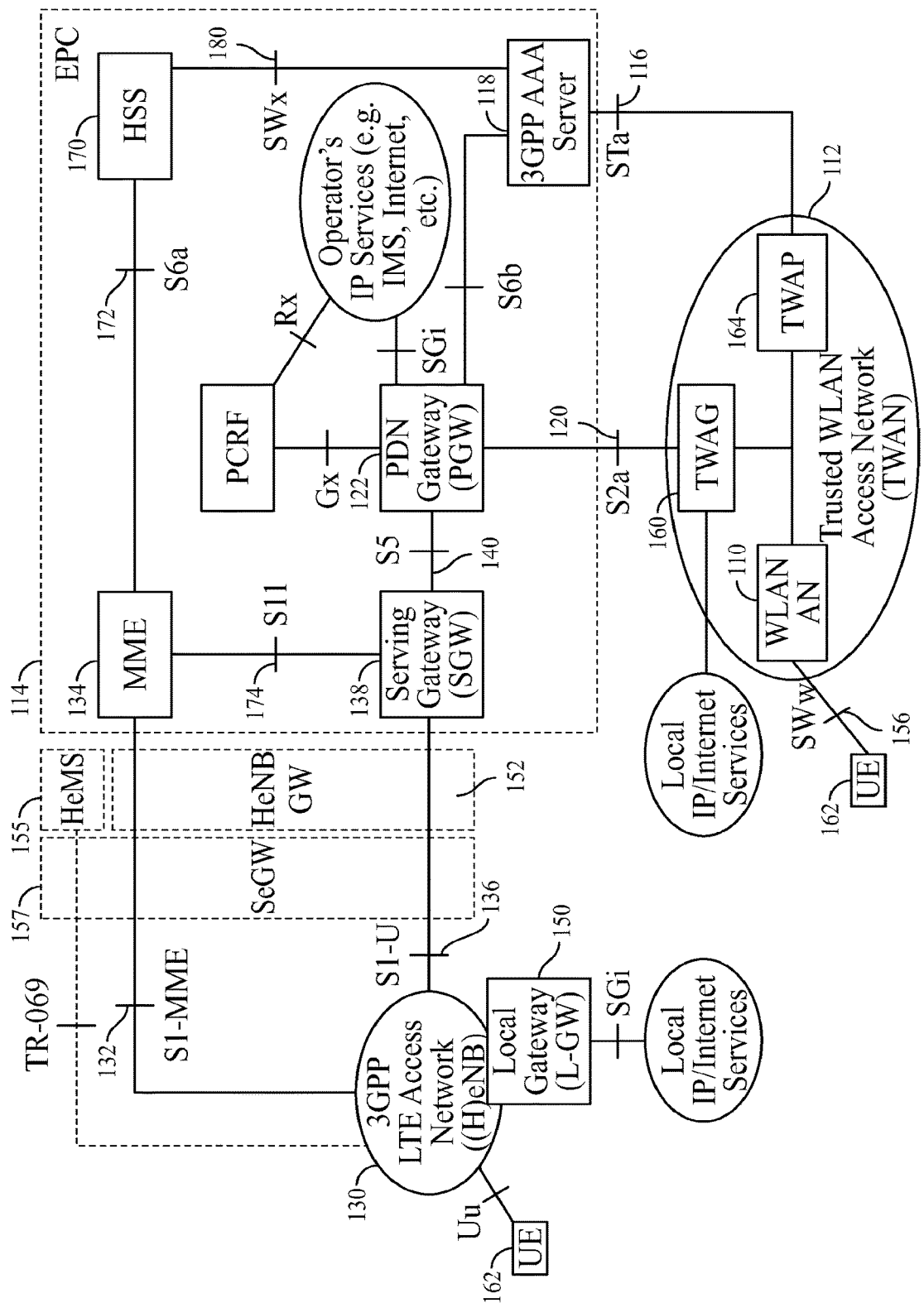
FIG. 1 depicts an example architecture for providing TWAN and 3GPP LTE access to a PDN.

Applicants disclose an inter-system mobility anchor control point that is adapted to initiate handover of an existing communication connection in an integrated small cell and WiFi (ISW) network. The inter-system mobility anchor control point is communicatively coupled to both an HeNB/LTE access network and trusted WLAN access network (TWAN) and adapted to operate as a common control plane entity for both HeNB/LTE and TWAN access. The mobility anchor control point may be, for example, a mobility management entity (MME) or an integrated small cell and WLAN gateway (ISW GW). The mobility anchor control point is adapted to request and receive measurement data relating to the operations of the HeNB access network and WLAN. Based upon the measurement data, the mobility anchor control point determines whether an existing communication path via one of the HeNB/LTE access network and WLAN should be handed over to the other of the networks. Upon determining a handover should be made, the mobility anchor control point coordinates the handover.

Example Mobile Network Operations

Under current practices, mobile network operators (MNOs) typically employ WiFi for offloading "best effort" Internet traffic from their cellular and core networks. However, increased interest in operator deployment of "small cells" and "carrier WiFi" is expected to encourage MNOs to seek better inter-operability across local cellular and WiFi networks. Generally, "small cells" refer to localized geographic areas providing wireless network access via operator-licensed spectrum using 3GPP-defined cellular Radio Access Technologies (RATs).

As operators adopt "carrier WiFi" to optimize their networks and reduce expenses, it is expected that there will be a greater deployment of "Trusted" WLAN Access Networks (TWAN) that can interface directly with an operator's Mobile Core Network (MCN). Similarly, it is expected that there will be greater integration of MNO deployed small cell and WiFi access networks within common geographical areas such as high-traffic urban metropolitan hotspot locations. Such integration is motivated by the growing number of smartphones that support both cellular and WiFi access.

In this context, the term "trusted WLAN (TWAN) access" refers to the circumstances wherein appropriate measures have been taken to safeguard the EPC from access via the WLAN. Such measures are left to the discretion of the MNO and may, for example, include establishment of a tamper-proof fiber connection between the WLAN and EPC, or establishment of an IPSec security association between the WLAN and a Security Gateway at the EPC edge. In contrast, if the WLAN access is deemed "untrusted," the WLAN may interface with an evolved Packet Data Gateway (ePDG) at the EPC edge, and the ePDG must establish an IPSec security association directly with each UE accessing the EPC through the WLAN.

3GPP Activities Related to WLAN Access

The GPRS Tunneling Protocol (GTP) has been the standard transport protocol for packet data in 3GPP networks. In terms of inter-working with different types of non-3GPP networks (e.g., WLAN, WiMAX, CDMA2000), the IETF Proxy Mobile IP (PMIP) protocol has also been standardized as a general solution. With respect to WLAN access networks, in particular, there has been activity directed at standardizing procedures for 3GPP access using the GTP protocol. The activities were intended to enable subscriber access to the MNO's core network via lower cost unlicensed 802.11 spectrum in lieu of expensive cellular spectrum. Although operator adoption of generic access network (GAN), I-WLAN, and Untrusted WLAN has been very limited, interest in Trusted WLAN seems to be gaining momentum, especially with respect to the GTP-based option.

The 3GPP Release 11 SA2 work item for "S2a Mobility based on GTP & WLAN access to EPC" (SaMOG) focused on enabling a GTP-based S2a interface to the PDN Gateway (PGW) for "Trusted WLAN Access Networks" (TWANs). This item precluded any solutions that would impact the UE. The Release 11 architectures, functional descriptions, and procedures for GTP-based S2a over trusted WLAN access were subsequently standardized. The applicable GTP control plane protocol for tunnel management (GTPv2-C) and the GTP user plane have also been standardized. SaMOG has been extended as a Release 12 work item to address several Release 11 limitations and will include TWAN solutions for UE-initiated PDN connectivity, multi-PDN connectivity, and seamless inter-system handover.

3GPP Release 10 standardized a GTP-based S2b interface for Untrusted WLAN access to the EPC. This included the associated support for a GTP-based S2b interface between an evolved Packet Data Gateway (ePDG) and the PGW. Untrusted WLAN solutions may require UE support for IPSec as well as EPC support of an ePDG for establishing an IPSec tunnel with each UE.

3GPP Release 6 provided a standardized WLAN Inter-working (I-WLAN) solution by introducing a Packet Data Gateway (PDG) for WLAN access to the "pre-EPC" packet-switched core network. This release additionally described how to reuse existing GGSN deployments to implement the PDG functionality using a subset of the Gn interface (denoted as Gn') via a "Tunnel Termination Gateway" (TTG) using GTP towards the GGSN. Again, these solutions may require UE support for IPSec as well as PDG/TTG support for establishing an IPSec tunnel with the UE.

3GPP Release 6 also standardized Generic Access Network (GAN) support for 2G/WiFi dual-mode handsets. Release 8 added support for 3G/WiFi handsets. Unlicensed Mobile Access (UMA) is the commercial name used by mobile carriers for GAN access via WiFi. GAN-enabled UEs can use WiFi to interface with a "GAN Controller" (GANC) that presents itself as a 2G BSC or 3G RNC to the core network. GANC provides a circuit-switched (CS) interface to the MSC, a packet-switched (PS) interface to the SGSN, and a Diameter EAP interface to the AAA Server/Proxy. It also includes a Security Gateway (SeGW) that terminates IPSec tunnels from the UE. Table 1 below illustrates the basic requirements for each GTP-based WLAN solution.

TABLE 1

|  | GAN/UMA (PS only shown) | I-WLAN | Untrusted WLAN | Trusted WLAN |
|---|---|---|---|---|
| Network Element | GANC | PDG/TTG | ePDG | TWAN |
| CN Interface | SGSN (or GGSN for Direct Tunnel support) | SGSN or GGSN | PGW | PGW |
| CN Protocols | GTP | GTP | GTP or PMIP | GTP or PMIP |
| UE Protocols | IKEv2/IPSec, EAP-AKA, Generic Access Radio Resource Control (GA-RRC), NAS protocols tunneled between UE and SGSN | IKEv2/IPSec, EAP-AKA | IKEv2/IPSec, EAP-AKA | EAP-AKA', WLAN Control Protocol (WLCP) as defined for SaMOG Phase 2. |

Each of the above activities were intended to enable subscriber access to an operator's mobile core network via lower cost unlicensed 802.11 access points in lieu of expensive cellular base stations. Although operator adoption of GAN, I-WLAN, and Untrusted WLAN has been very limited, interest in Trusted WLAN is growing.

Existing Architecture for Cellular LTE and TWAN Access to EPC

FIG. 1 depicts an existing 3GPP architecture that provides cellular LTE and Trusted WLAN access to an EPC 114. As described in section 16.1.1 of 3GPP Technical Specification (TS) 23.402, the contents of which are hereby incorporated herein by reference in their entirety, when a WLAN 110 is considered trusted by the operator, the Trusted WLAN Access Network (TWAN) 112 can be connected to the Evolved Packet Core (EPC) 114 via the STa interface 116 toward the 3GPP AAA Server 118 for authentication, authorization, and accounting via the S2a interface 120 toward the PDN Gateway (PGW) 122 for user plane traffic flows. An alternate path from the TWAN to a local IP network and/or directly to the Internet is also shown.

The 3GPP LTE access network 130 (i.e., evolved Node B) is connected to the EPC 114 via the S1-MME interface 132 which provides a communication path with the Mobility Management Entity (MME) 134. The S1-U interface 136 provides a communication path with the Serving Gateway (SGW) 138, which interfaces with the PDN Gateway (PGW) 122 via the S5 interface 140.

An optional "local gateway" function (L-GW) 150 provides small cell LTE access, e.g., for Home eNB (HeNB) deployments. Similarly, an optional "HeNB Gateway" (HeNB GW) 152 may be used to concentrate control plane signaling for multiple HeNBs toward the MME 134 and could also be used to handle HeNB user plane traffic toward the SGW 138. An optional HeNB Management System (HeMS) 155 provides "plug-and-play" auto configuration of HeNBs based on TR-069 standards published by the broadband forum (BBF) and adopted by 3GPP. An optional security gateway (SeGW) 157 provides trusted access to the EPC via the HeNB 152.

Home eNodeB (HeNB)

3GPP refers to an LTE femtocell as a Home eNodeB (HeNB). The HeNB is designed as "plug-and-play" customer premises equipment (CPE) that can be installed in residential and enterprise environments without the need for an experienced technician. HeNBs may also be deployed in public venues including "hotspot" locations. HeNBs use a broadband Internet connection to access a remote HeNB Management System (HeMS) for automatic configuration, while also providing backhaul access to the EPC network for cellular packet data services.

HeNBs operate in either closed, open or hybrid modes. Closed HeNBs only allow access to UEs that are part of an associated Closed Subscriber Group (CSG). Open HeNBs allow access to all subscribers. Hybrid HeNBs provide preferential treatment for associated CSG subscribers, but also allow access to other subscribers based on resource availability (possibly with reduced QoS).

In general, one of the main distinctions between HeNBs and eNBs is the "auto-configuration" feature using the TR-069 based HeMS. When an HeNB is powered-up with a broadband connection to the Internet, it accesses the HeMS based on DNS lookup using a pre-programmed "fully qualified domain name" (FQDN). From there, it receives all its configuration data including information for the Security Gateway (SeGW) to be used, and optionally the HeNB Gateway (HeNB GW) to be used.

Although other characteristics of a "small cell" eNB may be similar to those of an HeNB (e.g., reduced equipment cost, short range/low power operation, secure EPC access via SeGW, CSG restrictions, single/omni sector coverage, etc.), it is use of the HeMS and potential connectivity to an HeNB GW that distinguishes an HeNB from an eNB.

Trusted WLAN Access Network (TWAN)

WLAN Access Network (WLAN AN) 110 comprises one or more WLAN Access Points (APs). An AP terminates the UE's WLAN IEEE 802.11 link via the SWw interface 156. The APs may be deployed as standalone APs or as "thin" APs connected to a Wireless LAN Controller (WLC) using, for example, the IETF CAPWAP protocols.

Trusted WLAN Access Gateway (TWAG) 160 terminates the GTP-based S2a interface 120 with the PGW 122 and may act as the default IP router for the UE 162 on its WLAN access link. It also may act as a DHCP server for the UE 162. The TWAG 160 typically maintains a UE MAC address association for forwarding packets between the UE 162 (via the WLAN AP) and the associated S2a 120 GTP-U tunnel (via the PGW).

Trusted WLAN AAA Proxy (TWAP) 164 terminates the Diameter-based STa interface 116 with the 3GPP AAA Server 118. The TWAP 164 relays the AAA information between the WLAN AN 110 and the 3GPP AAA Server 118 (or Proxy in case of roaming). The TWAP 164 can inform the TWAG 160 of the occurrence of layer 2 attach and detach events. The TWAP 164 establishes the binding of UE subscription data (including IMSI) with UE MAC address and can provide such information to the TWAG 160.

Authentication and Security Over TWAN in Existing Systems

In existing systems, the UE 162 can leverage USIM features for both 3GPP and non-3GPP WLAN access. Processing for authentication and security is described in section 4.9.1 of 3GPP TS 23.402, the contents of which are hereby incorporated by reference in their entirety. As described therein, non-3GPP access authentication, such as that which takes place via a WLAN, defines the process that is used for access control and thereby permits or denies a subscriber from attaching to and using the resources of a non-3GPP IP access which is interworked with the EPC network. Non-3GPP access authentication signaling is executed between the UE and the 3GPP AAA server 118 and HSS 170. The authentication signaling may pass through AAA proxies.

Trusted 3GPP-based access authentication is executed across an STa reference point 116. The 3GPP based access authentication signaling is based on IETF protocols, e.g., Extensible Authentication Protocol (EAP). The STa interface 116 and Diameter application are used for authenticating and authorizing the UE 162 for EPC access via trusted non-3GPP accesses. 3GPP TS 29.273, the contents of which are hereby incorporated by reference in its entirety, describes the standard TWAN procedures currently supported on the STa interface.

IP Address Allocation Over TWAN in Existing Systems

For EPC access via GTP-based TWAN, the IPv4 address and/or IPv6 prefix is allocated to the UE 162 when a new PDN connection is established with the EPC 114 over the TWAN 112. A separate IP address may also be allocated by the TWAN 112 for local network traffic and/or direct Internet offload.

For PDN connectivity through EPC 114 via the TWAN 112, the TWAN 112 receives relevant PDN information via EAP/Diameter or WLCP signaling. The TWAN 112 may request an IPv4 address for the UE 162 from the PGW 122 via the GTP Create Session Request. The IPv4 address is delivered to the TWAN 112 during the GTP tunnel establishment via the GTP Create Session Response. When the UE 162 requests an IPv4 address for PDN connectivity via DHCPv4, the TWAN 112 delivers the received IPv4 address to the UE 162 within DHCPv4 signaling. Corresponding procedures are also defined for IPv6.

Existing Procedures for Access Via LTE

For 3GPP LTE access, the UE 162 automatically triggers a PDN connection as part of its initial attachment to the EPC network 114. The UE 162 may subsequently establish additional PDN connections as needed.

The primary purpose of the attach procedure is for the UE 162 to register with the network in order to receive services for which it has subscribed to. The attach procedure confirms the user's identity, identifies the services it is allowed to receive, establishes the security parameters (e.g., for data encryption), and notifies the network of the UE's initial location (e.g., in case it needs to be paged). Also, to support the "always-on" network connectivity expected by today's users, the LTE standards specify establishment of a default PDN connection as part of the Attach procedure. The radio resources for this default connection may be released during periods of inactivity, however the rest of the connection remains intact and the end-to-end connection can be quickly re-established by reassigning the radio resources in response to UE service requests.

When a UE 162 attempts to attach to the EPC 114 via an (H)eNB LTE network 130, it first establishes an RRC connection with the (H)eNB LTE network 130 and encapsulates the Attach Request within the RRC signaling. The (H)eNB LTE network 130 then forwards the attach request to the MME 134 via S1-AP signaling on the S1-MME interface 132. The MME 134 retrieves subscription information from the HSS 170 via the S6a interface 172 in order to authenticate the UE 162 and allow attachment to the EPC 114.

After successfully authenticating the UE 162, the MME 134 selects an SGW 138 (e.g., based on proximity to the (H)eNB LTE network 130), and also selects a PGW 122 (e.g., based on the default APN retrieved from HSS 170 or a specific APN requested by UE 162). The MME 134 communicates with the SGW 138 over the S11 interface 174 and requests creation of the PDN connection. The SGW 138 executes the signaling to establish a GTP user plane tunnel with the designated PGW 122 over the S5 interface 140.

"GTP control" signaling takes place within the S1-AP protocol between the MME 134 and (H)eNB 130. This ultimately leads to the establishment of a GTP user plane tunnel on the S1-U interface 136 between (H)eNB 130 and SGW 138. The path for the PDN connection between the UE 162 and PGW 122 is thus completed through the (H)eNB 130 and SGW 138.

The end-to-end path for the PDN connection between the UE 162 and PGW 122 is thus completed through the (H)eNB and SGW.

Existing Procedures for EPC Access Via TWAN

In existing systems where communications take place via the TWAN 112, UE 162 authentication and EPC 114 attachment is accomplished via EAP signaling between the UE 162 and 3GPP AAA Server 118.

The PDN connectivity service is provided by the point-to-point connectivity between the UE 162 and the TWAN 112, concatenated with S2a bearer(s) 120 between the TWAN 112 and the PGW 122. Unlike the LTE model, the WLAN radio resources are "always-on" from an EPC perspective. In other words, any power-saving optimizations are handled transparently using IEEE 802.11 procedures within the WLAN.

When a UE 162 attempts to attach to the EPC 114 via a TWAN 112, it first establishes a Layer 2 connection with the WLAN 110 and encapsulates EAP messages within EAPoL signaling. The WLAN 110 forwards the EAP messages to a TWAP 164 which encapsulates the messages within Diameter signaling and forwards the messages to the 3GPP AAA Server 118 via the STa interface 116. The 3GPP AAA Server 1118 retrieves subscription information from the HSS 170 via the SWx interface 180 in order to authenticate the UE 162 and allow attachment to the EPC 114.

For 3GPP Release 11, the 3GPP AAA Server 118 also provides the TWAN 112 with information via STa interface 116 for establishing a PDN connection to the default PDN provisioned in the HSS 170. The TWAN 112 then exercises GTP control plane (GTP-C) and user plane (GTP-U) protocols over the S2a interface 120 directly toward the PGW 122, thereby completing the PDN connection between the UE 162 and PGW 122 through the TWAN 112.

For 3GPP Release 12, the SaMOG phase-2 work item defines additional procedures for UE-initiated PDN connectivity, multi-PDN connectivity, and seamless inter-system handover. For the case of single-PDN capable TWAN scenarios, EAP extensions are defined to support UE-initiated PDN requests and seamless inter-system handover requests. For the case of multi-PDN capable TWAN scenarios, a WLAN Control Protocol (WLCP) is defined between the UE and TWAN to enable one or more UE PDN connection requests and seamless handover procedures. However, separate procedures are still utilized between the UE and 3GPP AAA Server for UE authentication.

Existing Procedures for HeNB Gateway (HeNB GW)

Section 4.6 of 3GPP TS 36.300, the contents of which are hereby incorporated by reference herein in their entirety, describes the Stage 2 architecture, functions, and interfaces to be supported by HeNBs and HeNB GWs. As described therein, the E-UTRAN architecture may deploy a Home eNB Gateway (HeNB GW) to allow the S1 interface between the HeNB and the EPC to support a large number of HeNBs in a scalable manner. The HeNB GW serves as a concentrator for the C-Plane, specifically the S1-MME interface. The HeNB GW appears to the MME as an eNB. The HeNB GW appears to the HeNB as an MME.

Selection of an MME at UE attachment is hosted by the HeNB GW instead of the HeNB. The HeNB GW relays Control Plane data between the HeNB and the MME. The HeNB GW terminates the non-UE-dedicated procedures—both with the HeNB, and with the MME. The scope of any protocol function associated to a non-UE-dedicated procedure is between HeNB and HeNB GW and/or between HeNB GW and MME. Any protocol function associated to a UE-dedicated-procedure resides within the HeNB and the MME only. The HeNB GW may optionally terminate the user plane towards the HeNB and towards the S-GW, and relay User Plane data between the HeNB and the S-GW.

Communication Session Bearer Creation

Figure 2:
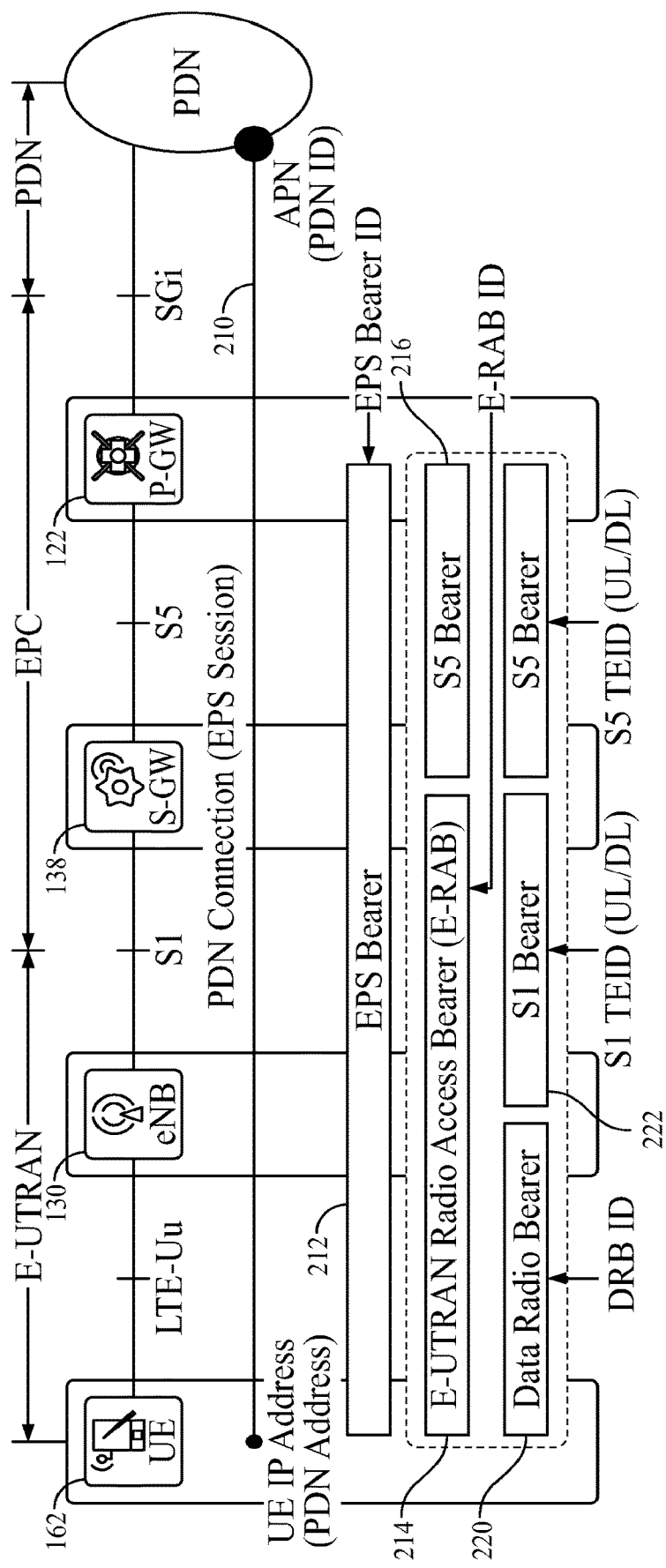
FIG. 2 depicts bearers and sub-bearers comprised in a PDN connection.

Creating a communication session between a UE and the packet data network (PDN) involves creating communication paths between the various network entities through which the communication path flows. The virtual communication path between network components is sometimes referred to as a bearer service or bearer. A bearer between two end points in a virtual connection may be comprised of sub-connections or bearers representing communications between non-endpoints. FIG. 2 illustrates the concept of a bearer and sub-bearers for a PDN connection. As shown, a PDN connection, which is represented by the thin solid line 210, has been established between the UE and the PDN. This connection between the two end points results from the creation of bearers or virtual communication paths between devices in the network. As shown, this connection comprises an EPS Bearer 212 that may be understood to exist between the UE 162 and the PGW 122. The EPS Bearer 212 may be understood to be composed of the E-UTRAN Radio Access Bearer 214 (from UE 162 to SGW 138) and S5 Bearer 216 (from SGW 138 to PGW 122). Still further, E-UTRAN Bearer 214 may be understood to comprise Data Radio Bearer 220 (from UE 162 to eNB 130) and S1 Bearer 222 (from ENB 130 and SGW 138). Accordingly, any communication connection will often comprise several virtual connections or bearers that need to be established in order to support communication.

According to existing processing, bearer(s) are typically established during an attach process for default bearer(s) and/or dedicated bearer(s), or via a call set up after idle mode for dedicated bearer(s). Bearer(s) may be switched via a "Modify Bearer Request/Response" message which in an example embodiment, comprises the IP address and Tunnel Endpoint ID (TEID) of the bearer endpoints. In an example scenario, the "Modify Bearer Request/Response" messages may be communicated on the S5 interface between the S-GW 138 and P-GW 122. The bearer related messaging may vary between points in the network. For example, a "Create Session Request" message may be used to establish bearers between the UE 162 to the S-GW 138 and may require information about the PDN such as, for example, the PDN ID, type, and address.

3GPP EPC-CDMA20000 Standard Internetworking

Figure 3:
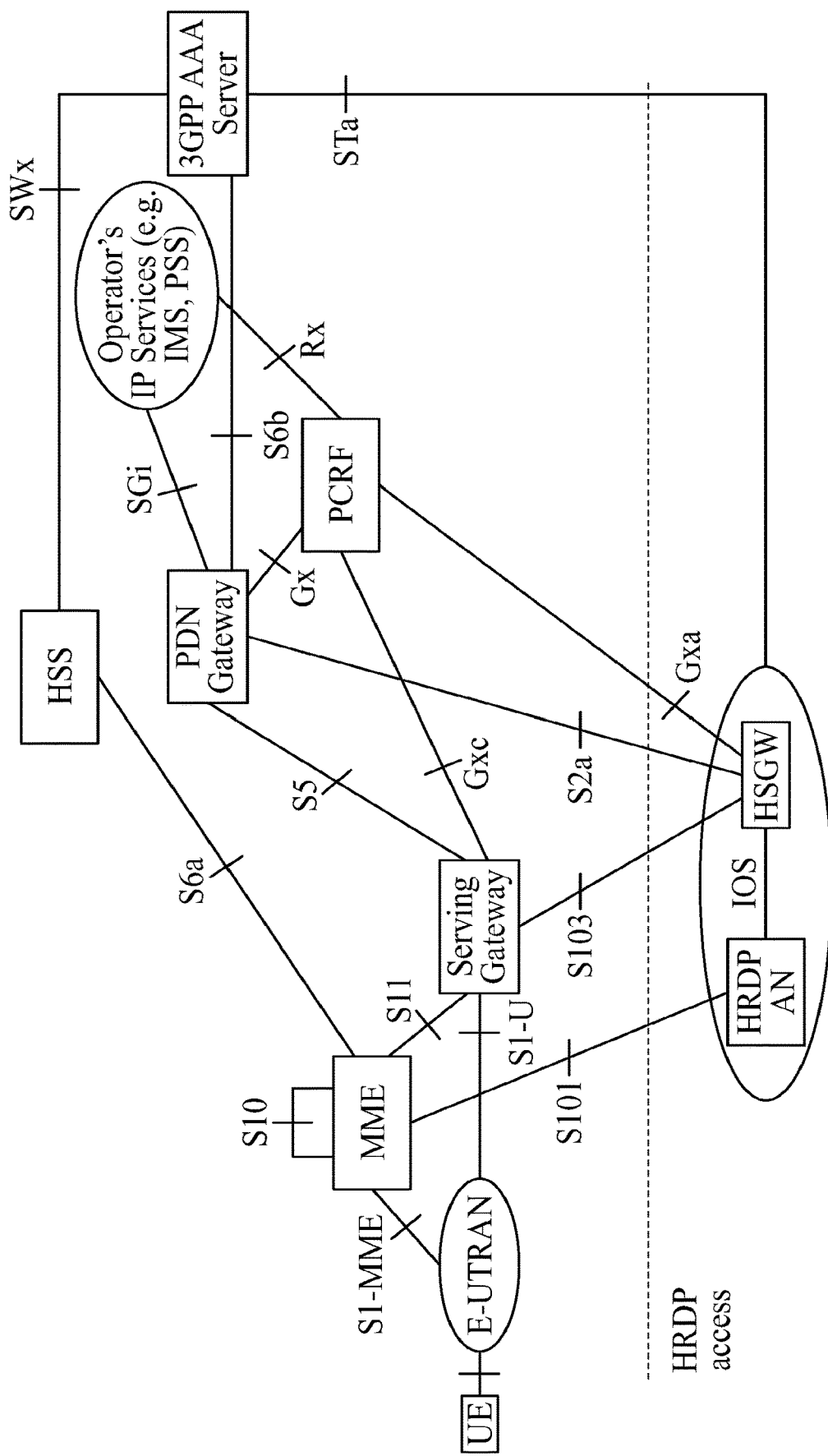
FIG. 3 depicts an example CDMA architecture.

It will be appreciated that networking configurations and technologies other than those discussed above in connection with FIG. 1 may exist. For example, an architecture such as depicted in FIG. 3 has been considered for the "trusted" CDMA2000 High Rate Packet Data (HRPD) access to the EPC. As shown in FIG. 3, two interfaces, namely, S101 and S103, are included. The S101 interface carries control plane information between the HRPD access network and the MME for inter-system pre-registration and handover. The S103 interface carries the user plane between SGW and HSGW for lossless inter-system handover. Accordingly, various limited attempts have been made to address inter-networking issues such as handovers. However, efforts such as depicted in FIG. 3 are limited in their applicability to particular technology implementations such as CDMA.

3GPP-WLAN Radio Interworking

Figure 4:
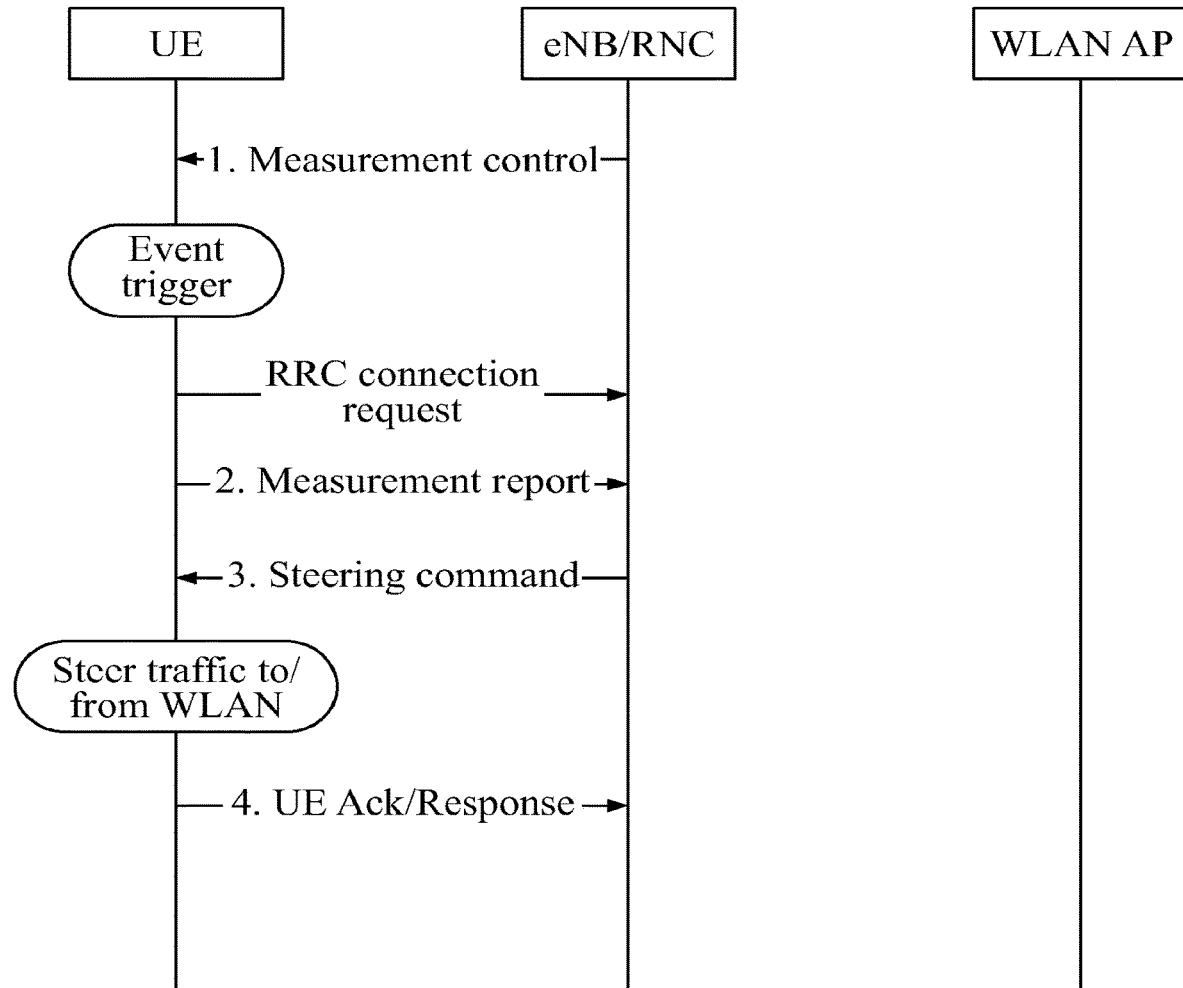
FIG. 4 depicts message flows relating to network controlled traffic steering.

A network-controlled traffic steering solution was proposed in 3GPP TR 37.834 as part of the WLAN-3GPP radio interworking study item (SI). The corresponding message flow is shown in FIG. 4. As shown in FIG. 4, the eNB/RNC node receives measurement reports of WLAN metrics and, based upon this information, determines either to steer traffic to or from the WLAN. Table 2 below lists the measurements that were proposed for receipt at the eNB/RNC (See TR 37.834). Upon evaluating the received measurement information, the eNB/RNC communicates a steering command message to the UE to perform the traffic steering.

TABLE 2

Candidate Measurements to Report for WLAN
TABLE 2

| Identifier | Description | Availability in WLAN |
|---|---|---|
| RCPI | Received Channel Power Indicator: Measure of the received RF power in the selected channel for a received frame in the range of −110 to 0 dBm | Measurement |
| RSNI | Received Signal to Noise Indicator: An indication of the signal to noise plus interference ratio of a received IEEE 802.11 frame. Defined by the ratio of the received signal power (RCPI-ANPI) to the noise plus interference power (ANPI) in steps of 0.5 dB in the range from −10 dB to +117 dB | Measurement |
| BSS Load | Contains information on the current STA population and traffic levels in the BSS. | Beacon or Probe Response (802.11k) |
| WAN metrics | Includes estimates of DL and UL speeds and loading as well as link status and whether the WLAN AP is at capacity. | ANQP (HS 2.0) |

As noted in TR 37.834, the contents of which are hereby incorporated by reference herein in its entirety, these proposed procedures do not result in an operable solution and are incomplete. For example, the RAN would need to know which APNs/bearers may be (not) offloaded. The RAN also needs means to inform the UEs so that the UE can issue the corresponding [DSMIPv6] binding update with the CN over S2c. This would impact signaling between CN and eNB as well as the UE behavior between AS and NAS level. Accordingly, this and other efforts have failed to provide an operable implementation that addresses the issues noted above.

Network-Initiated Handover in Integrated Small Cell and WiFi Networks

As the above description illustrates, under current practices, cellular network and WiFi interworking occurs in the PGW. This was seen as the least disruptive solution for inter-working WiFi hotspots into the EPC core along with existing macrocell deployments. Macro cell coverage was typically viewed as ubiquitous, while the availability of opportunistic WiFi hotspots was intermittent.

Such existing methods of interworking is slow as it requires access and control by devices within the core of the EPC. Existing handover processing relies upon the PGW as the mobility anchor point, which creates a bottleneck in the core network because the PGW must process all handover decisions. Further, all requests are received through the S2a interface, which creates another processing bottleneck deep in the core network.

Furthermore, communications that are reliant upon processing at the core of the network, such as current methods of processing handover decisions, have an increased opportunity to be disrupted as the communications travel to and from the network core. Moreover, this model does not scale well for the large number of small cell and "trusted" WLAN deployments anticipated in the near future.

Applicants have noted that existing handover processing at the network core, i.e., PGW, is inefficient. Under current practices, during inter-system handover, the PGW removes the entirety of the existing GTP-based tunnels between the UE and the PGW, and establishes a new tunnel between all of the entities from the UE to the PGW. The removed tunnel includes those portions or sub-tunnels that exist between systems such as between the SGW and PGW which are also connected by the newly created tunnel. Applicants have noted the inefficiency introduced by removing all portions of the existing tunnel rather than only those portions that need to be changed in order to support the requested handover.

Still further, applicants have noted that existing handover and multi-channel processing is initiated by the UE, which in current implementations lacks information about the network conditions. The UE initiates the handover and multi-channel requests, even though the UE does not have information regarding network conditions such as load levels and congestion. Accordingly, under existing processing techniques initiated at the UE, the decisions to handover and form multi-channel connections are being made with less than optimal information.

Given the anticipated deployment of many co-located small cell and WiFi access points, Applicants have noted that it would be beneficial to standardize some inter-working functionality closer to the small cell and WiFi access points.

Such a capability could reduce user plane switching delays across access technologies and minimize the amount of signaling through the MCN to the PGW. Applicants have also noted that it would be beneficial to have the decisions regarding handovers made by network elements that have access to relevant network status information rather than by UEs which are often lacking such information.

Applicants have developed systems and methods for network-initiated inter-system handover managed by a local mobility anchor point. According to one aspect of the disclosed embodiments, a local mobility anchor point, which may be a server or machine located near the edge of the processing network such as, for example, an MME, is programmed to field requests for handovers and for forming multi-channel connections. The mobility anchor point is located away from the EPC core and thereby is not subject to the same bottlenecks and delay associated with exclusive PGW processing. Moreover, the mobility anchor point may be located in the network and thereby have more ready access to information regarding the status of the network. The mobility anchor point may make use of such information regarding network status in initiating a handover or the formation of a multi-channel connection with a UE.

Applicants have developed several embodiments for providing network initiated handover and multi-channel formation. In a first embodiment, processing is performed substantially at an MME and an SGW. An MME is extended to operate as the common inter-system control plane mobility anchor for both TWAN and HeNB/LTE access, and the SGW is extended to provide a common inter-system user plane anchor for both TWAN and HeNB/LTE access. The MME/SGW local mobility anchor point is located away from the core network and is not subject to the same bottlenecks associated with PGW-exclusive processing. Further, the MME/SGW may determine to perform a handover or form a multi-channel connection based upon recent data reflecting current network conditions as well as conditions at the relevant UE. Processing associated with an MME/SGW embodiment is discussed below in connection with FIGS. 5 to 11.

In a second embodiment, an integrated small cell and WiFi gateway (ISW GW) serves as the mobility anchor point for both control and user planes. The ISW GW acts as a control plane and user plane gateway for both HENB/LTE and TWAN access. The ISW GW is integrated with the MME which provides control plane services for both HENB/LTE and TWAN access. The ISW GW is also integrated with the SGW which provides user plane services for both HENB/LTE and TWAN access. The ISW GW local mobility anchor point is located away from the core network and is not subject to the same bottlenecks associated with PGW-exclusive processing. Further, the ISW GW may determine to perform a handover or form a multi-channel connection based upon recent data reflecting current network conditions as well as conditions at the relevant UE. Processing associated with an ISW GW embodiment is discussed below in connection with FIGS. 12 to 18.

MME/SGW Based Inter-System Handover

According to one aspect of the disclosed embodiments, the MME existing in the control network of the EPC has been extended to provide a common control plane entity for both LTE and WiFi access, while the SGW, which is also located in the EPC, has been extended to function as a common user plane gateway for both LTE and WiFi access. The disclosed combination of an MME and SGW with corresponding interfaces to the WiFi and LTE networks may be referred to as an "Integrated Small Cell and WiFi Network" (ISWN). An ISWN may include enhancements to multi-RAT terminal capabilities, small cell and WiFi access capabilities, EPC network elements, and policy/traffic management functions.

The enhanced MME and SGW functionality as disclosed herein result in GTP-based integrated small-cell and WiFi (ISW) connectivity and mobility. In one embodiment, the MME may interact with separate gateways for LTE and WiFi access, i.e., SGW and TWAG respectively, or with an "ISW-enabled" SGW, including a combined SGW/TWAG. The UE interacts with the 3GPP AAA Server for EPC attachment via the TWAN, while the TWAN established connectivity to the PDN according to the procedures described herein.

As describe below, the MME/SGW is programmed to operate as a mobility anchor point and to determine connectivity and communication paths to the PDN for both HeNB and TWAN access. According to one aspect of the disclosed embodiments, communication of an IP data stream or "IP flow" to/from a single PDN may be switched or handed over to another of the LTE or TWAN connections based on local conditions and policies. The "handover" feature allows for selective use of connections for the purpose of optimizing throughput and minimizing resource expense.

Figure 5:
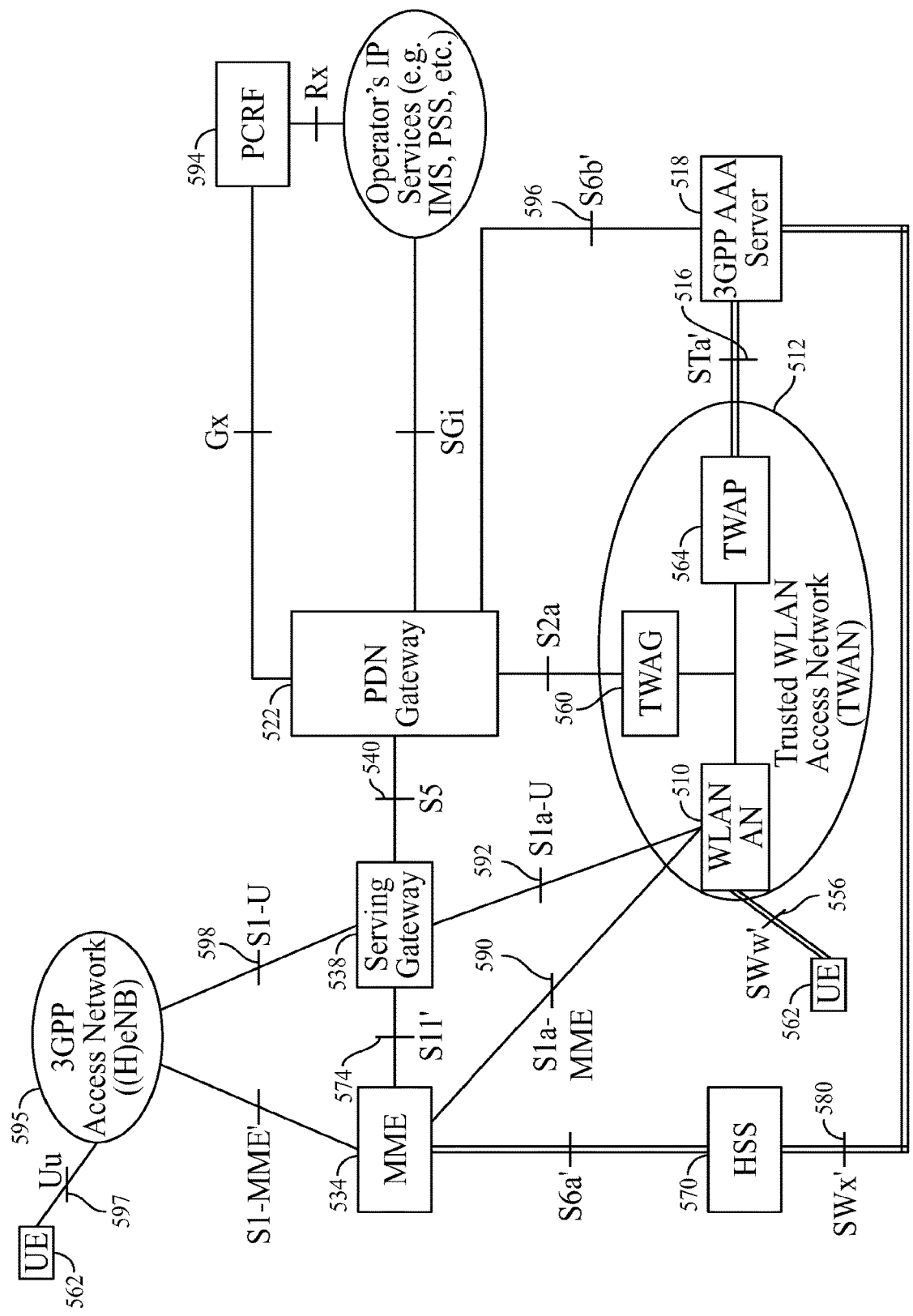
FIG. 5 depicts an example system for providing integrated HeNB/LTE and TWAN access to a PDN.

FIG. 5 depicts an example embodiment of a system for providing inter-system mobility, including handover, in integrated WLAN and LTE access networks. As shown in FIG. 5, the example embodiment comprises a new "S1a-MME" (which may also be referred to as "S1a-C") control plane interface 590 between the MME 534 and the TWAN 512, and a new "S1a-U" user plane interface 592 between SGW 538 and TWAN 512. With the S1a-MME and S1a-U interfaces in place, the MME 534 operates as a common control plane entity for both LTE network 595 and TWAN 512 access, while the SGW 538 operates as a user plane gateway for both LTE 595 and TWAN 512. The integrated MME 534 and SGW 538 allow for user equipment (UE) 562 to access the capabilities of a packet data network (PDN) through either the LTE access network 595 or TWAN 512. Moreover, and as described in detail in connection with FIGS. 9 and 11, an existing communication connection between a UE 562 and a PDN 522 may be handed over from one of the LTE network 595 or TWAN 512 to the other.

In the embodiment of FIG. 5, the S1a-MME 590 and S1a-U 592 interfaces terminate in the WLAN 510 comprised in the TWAN 512. In one embodiment, the functionality that had traditionally been provided by TWAG 560 has been combined with the SGW 538. The combined SGW and TWAG 538 offer the benefit of reducing the number of device hops from the UE 562 to the PGW 522. In the embodiment of FIG. 5, the S1a-MME 590 and S1a-U 592 interfaces terminate in the TWAN 512, but terminate specifically in the WLAN AN 510 rather than the TWAG 560 as might be implemented in another embodiment.

According to an aspect of the disclosed systems and methods, the transport network connection on the S1a-MME interface 590 between MME 534 and TWAN 512 is established using extensions to Operation, Administration, and Maintenance (OAM) procedures. In embodiments where GTPv2-C is employed as the baseline protocol stack, a User Datagram Protocol (UDP) is established over an IP path for the exchange of subsequent signaling messages on the "S1a-MME" interface. In another embodiment, a Stream Control Transport Protocol (SCTP) over IP path may be used.

Control Plane Stack for MME/SGW Inter-System Handover

Figure 6:
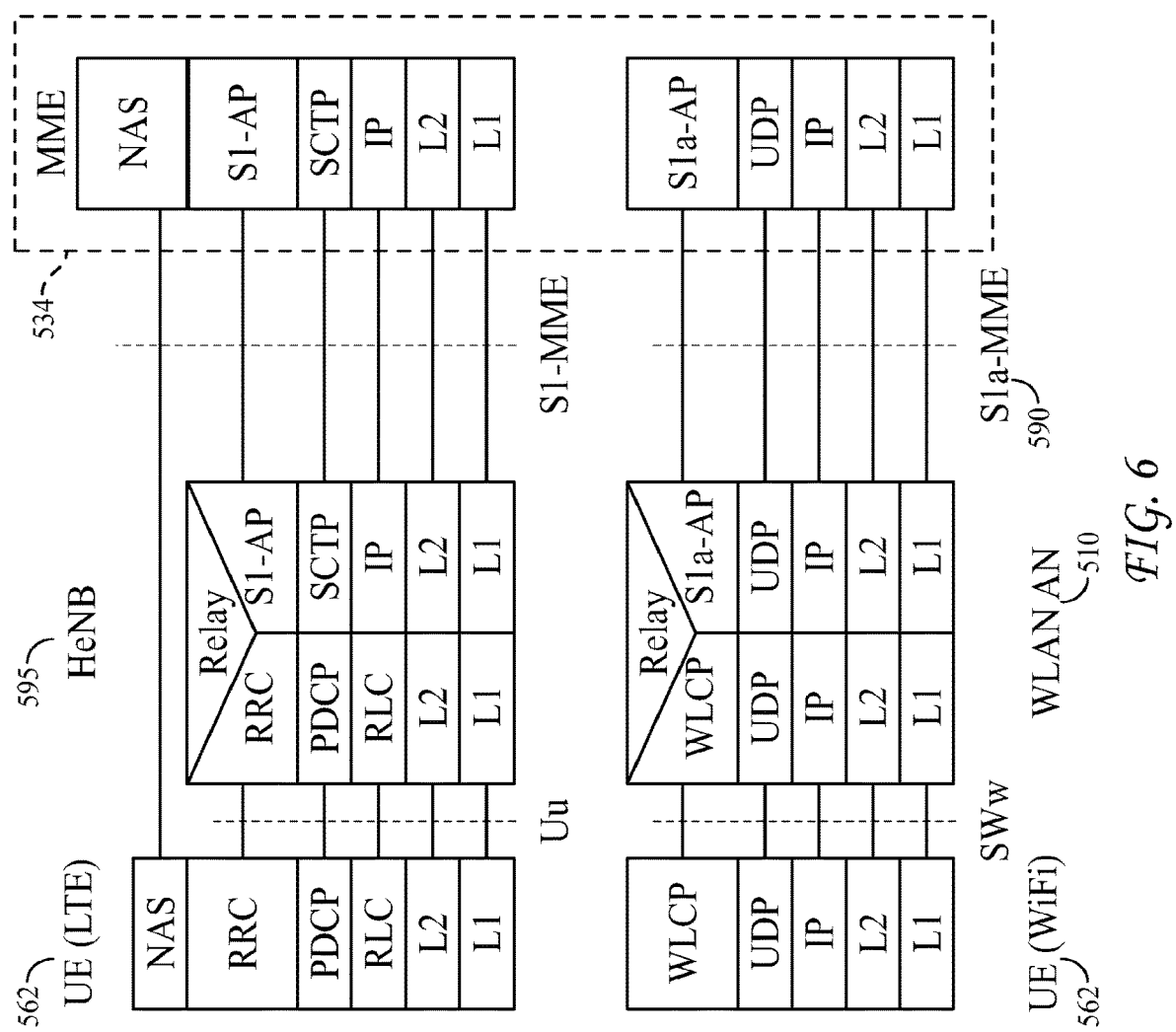
FIG. 6 depicts an example control plane protocol stack.

The control plane protocol stacks are implemented so as to support the processing described herein. FIG. 6 depicts a control plane protocol stack consistent with an example embodiment. Generally, the standard S1-AP protocol, along with its associated S1-MME interface, carry the standard information from/to (H)eNB 595.

In a few instances, the S1a-AP protocol that is used over reference point S1a-MME 590 has been extended to support the processing as disclosed herein. For example, in an example embodiment, an "eNB Direct Information Transfer" message may be employed from the (H)eNB 595 to the MME 534 and may communicate the LTE & WiFi Measurement Reports to the MME 534 to enable it to make handover decisions. In existing systems, the message may be defined as a "non-UE associated" message. Accordingly, the message may be used to transfer the non-UE associated WLAN measurements of Table 2 such as BSS load and WAN metrics. This approach may be used when the UE 562 communicates WLAN metrics to the eNB 595 via RRC messaging as described above in connection with FIG. 4. Alternatively, an NAS-like "Measurements reports" message may be communicated from the UE 562 to the MME 534 via the (H)eNB 595, which may comprise all of the UE-associated measurements described in Table 2. In this case, the message may be conveyed from the UE 562 to the (H)eNB 595 using the standard RRC "Uplink Direct Transfer" message and from the (H)eNB 595 to the MME 534 using the standard S1-AP "Uplink NAS transport message."

In an example embodiment, the "Handover Command" may comprise slightly different information as compared to the standard message defined for intra-RAT handover in 3GPP TS 23.401, the contents of which are hereby incorporated by reference in its entirety. In particular, the message may further comprise, for example, a handover (HO) status, According to an example embodiment, the newly defined S1a-AP protocol between the WLAN AN 510 and MME 534 is based on the GTPv2-C tunnel protocol. The S1a-AP protocol may also employ the "Notification Request/Response" message to communicate the initial request and HO related information including the request/status and address and TEID of the source to be used by the destination. The message information may be transmitted from the WLAN AN 510 to the MME 534 and may comprise information indicating the handover is complete ("Handover Complete") and that the WLAN AN 510 and UE 562 are ready for WiFi connection. The message may also be used for related acknowledgements. In another example embodiment, the S1a-AP may be based on the SCTP transmission protocol similar to the S1-AP.

In existing methodologies, the above-mentioned GTPv2-C-based message has been reserved for use on S101 interface. In an example embodiment of the systems and methods disclosed herein, in order to implement the modified messages on the S1a interface, new message type values are defined for these different cases. Currently, the message type values of 248 to 255 have been reserved for future use as explained in 3GPP TS 29.274, the contents of which are hereby incorporated herein by reference in its entirety. Accordingly, these message type values may be used for S1a messages.

A more complete description of the messages along with the new/modified information elements are introduced below in Table 3. In Table 3, entries designated with a single asterisk (*) are new messages and information elements. The entries designated with two asterisks (**) also represent new messages and information elements, but may be alternative NAS-based messages. The message flows are further described in the context of attach and handover processing as explained below in connection with FIGS. 8-11.

TABLE 3

New/Modified protocol messages for MME-based ISW network architecture
TABLE 3

| Protocol | Message Name | Message Direction | New/Modified Information Elements | Message Purpose |
| --- | --- | --- | --- | --- |
| RRC (LTE over Uu) | Measurement Reports | UE to (H)eNB | LTE (*& WiFi) measurement reports | Carrying LTE & WiFi measurement reports to the (H)eNB |
| | Mobility from E-UTRA | (H)eNB to UE | — | (H)eNB informing the UE of the handover decision to WLAN |
| | ** UL Information Transfer | UE to (H)eNB | **LTE & WiFi measurement reports | Carrying LTE & WiFi measurement reports to the MME via (H)eNB |
| | **DL Information Transfer | (H)eNB to UE | **Handover Command | MME informing the UE of the handover decision via (H)eNB |
| S1-AP (SCTP over S1-MME) | eNB Direct Information Transfer | (H)eNB to MME | *Measurement Reports | Carrying UE-originated LTE & WiFi measurement reports and HeNB-originated to the MME |
| | Handover Command | MME to (H)eNB | — | MME informing (H)eNB of its decision to make handover to WLAN |
| | **Uplink NAS transport | (H)eNB to MME | **LTE & WiFi measurement reports | Carrying UE-associated measurements to the MME |
| | **Downlink NAS transport | MME to (H)eNB | **Handover Command | MME informing (H)eNB of its decision to make handover |

TABLE 3-continued

New/Modified protocol messages for MME-based ISW network architecture
TABLE 3

| Protocol | Message Name | Message Direction | New/Modified Information Elements | Message Purpose |
|---|---|---|---|---|
| WLCP (WiFi over SWw) | *PDN Connectivity Request | UE to WLAN AN | Initial or Handover | Initiating connectivity request to PDN over WiFi |
| | *PDN Connectivity Accept | WLAN AN to UE | — | Indicating the acceptance of the request (initial or HO) |
| | *PDN Connectivity Complete | UE to WLAN AN | — | Acknowledgment of receiving the "Accept" notice |
| | *Measurement Reports | UE to WLAN AN | *LTE & WiFi measurement reports | Carrying LTE & WiFi measurements over WiFi to the WLAN AN |
| | *Handover Command | WLAN AN to UE | — | WLAN AN informing UE to make handover to LTE |
| S1a-AP (GTPv2-C over S1a-MME) | *Notification Request/Response | WLAN AN to MME | *WLAN AN TEID | Carrying tunnel-related (e.g. TEID) and other information (e.g. initial, HO request/status) |
| | | WLAN AN to MME | *Measurement Reports | Carrying measurements to the MME for HO decision |
| | | MME to WLAN AN | *SGW TEID | Carrying tunnel-related (e.g. TEID) |
| | | MME to WLAN AN | *HO Command | MME informing WLAN AN of a handover to LTE |
| | | WLAN AN to/from MME | *HO Complete | Indicating the completeness of the HO |
| | | MME to/from WLAN AN | — | Acknowledgement |
| S11 (GTPv2-C) | Modify Bearer Request | MME to S-GW | *WLAN AN or (H)eNB TEID/address | Sending tunneling info to the S-GW to modify it |
| | Modify Bearer Response | S-WG to MME | — | Acknowledgement |

User Plane Protocols

Figure 7:
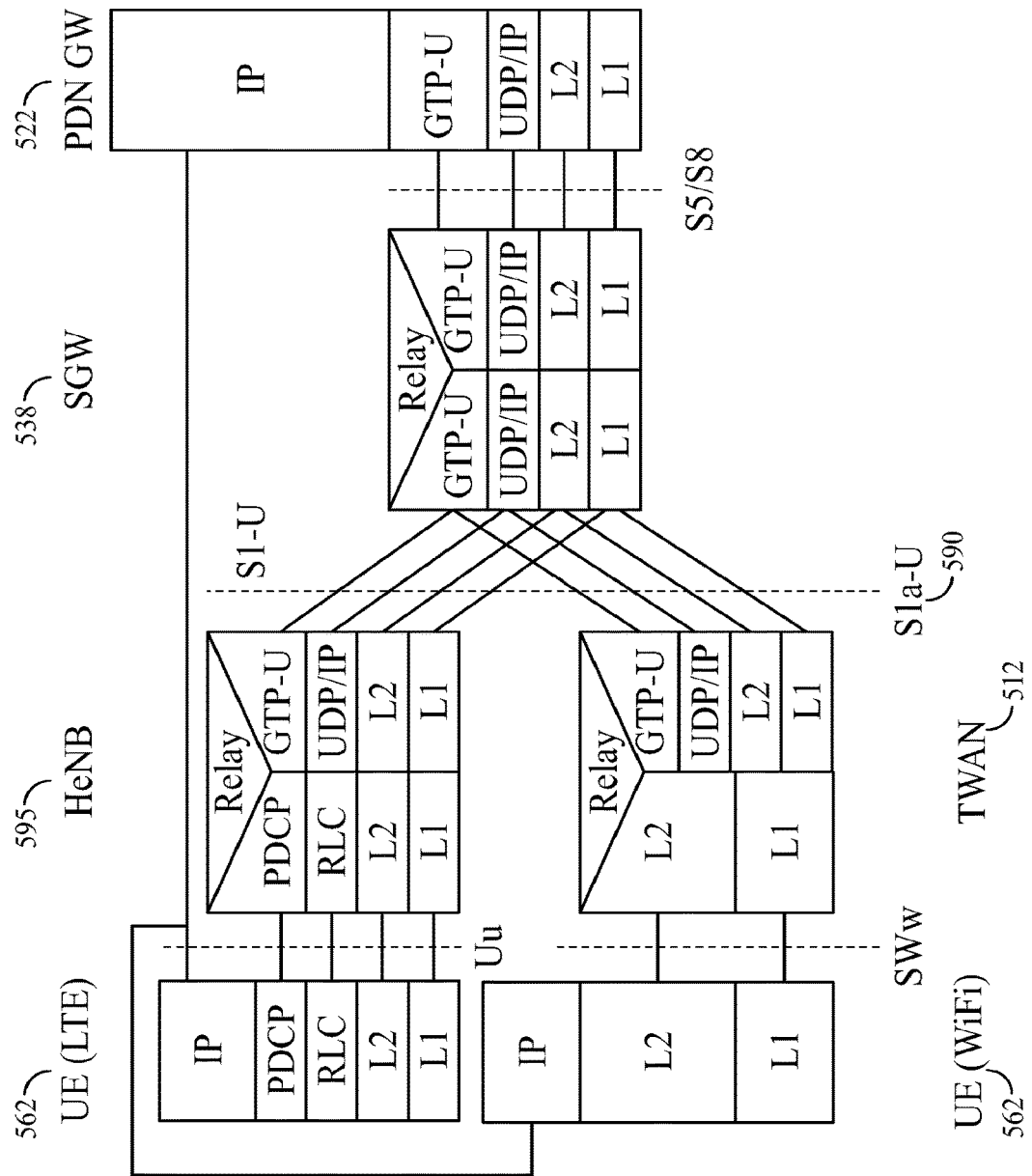
FIG. 7 depicts an example HeNB user plane protocol stack.

FIG. 7 depicts a user plane protocol stack for use with an example embodiment. As shown, the communications between the LTE UE 562 and the (H)eNB 595 occur over a standard Uu interface. A standard SWw interface connects the WiFi UE 562 to the WLAN AN 510.

The (H)eNB 595 and the WLAN AN 510 encapsulate the user plane data into a GTP-U tunnel and send it to the Serving GW 538. As shown, the newly defined S1a interface carries the user plane data using the GTP-U protocol between the WLAN AN 510 and S-GW 538. The GTP tunnels from the Serving GW 538 to the (H)eNB 595 or the WLAN AN 510 are activated/deactivated as dictated by the handover decision entity (e.g., MME 534) based on which air interface is being utilized. The GTP-U tunnel between the Serving GW 538 and the PDN Gateway 522 is consistent with standard protocols. It will be appreciated that the UE 562 has the same IP address and IP connection to the PDN GW 522, irrespective of if it is using WiFi or LTE air interface.

Trusted WLAN Initial PDN Connectivity Via MME

Before a UE 562 may communicate with a PDN via the PGW 522, the UE 562 must attach to the PGW 522. In an example embodiment, the MME 534 orchestrates the UE 562 attachment via the TWAN 512. The initial connectivity is orchestrated over the newly defined S1a-MME interface 590. In an example embodiment, the WLCP protocol is employed over the WiFi air interface, and GTPv2-C Notification Request/Response messages are communicated over the S1a-MME interface 590. Standard Create Session Request messages are communicated between the MME 534, S-GW 538, and PGW 522.

Figure 8A:
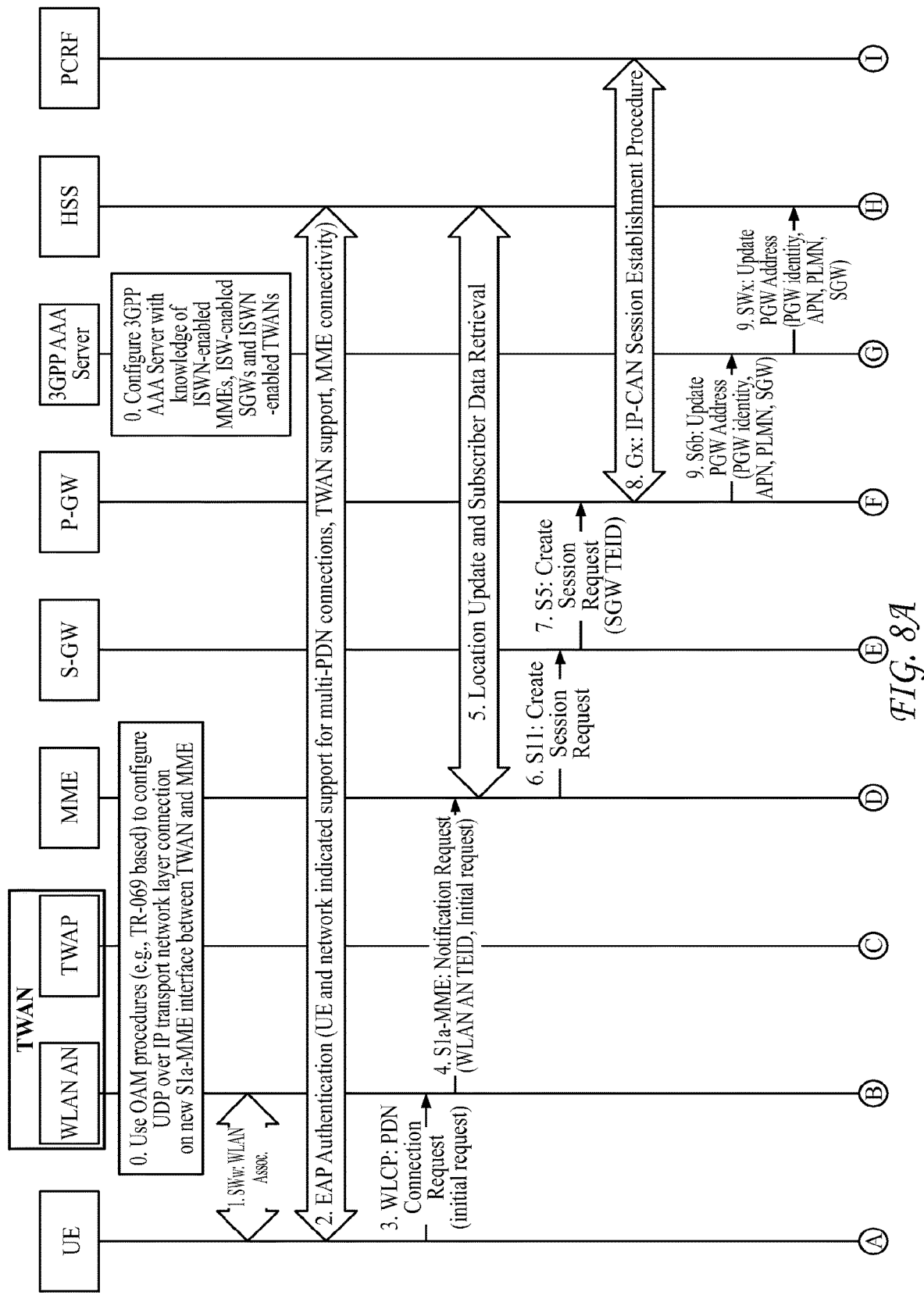
FIGS. 8A-B depict a diagram depicting example processing associated with a UE attaching via a TWAN to a PDN.
Figure 8B:
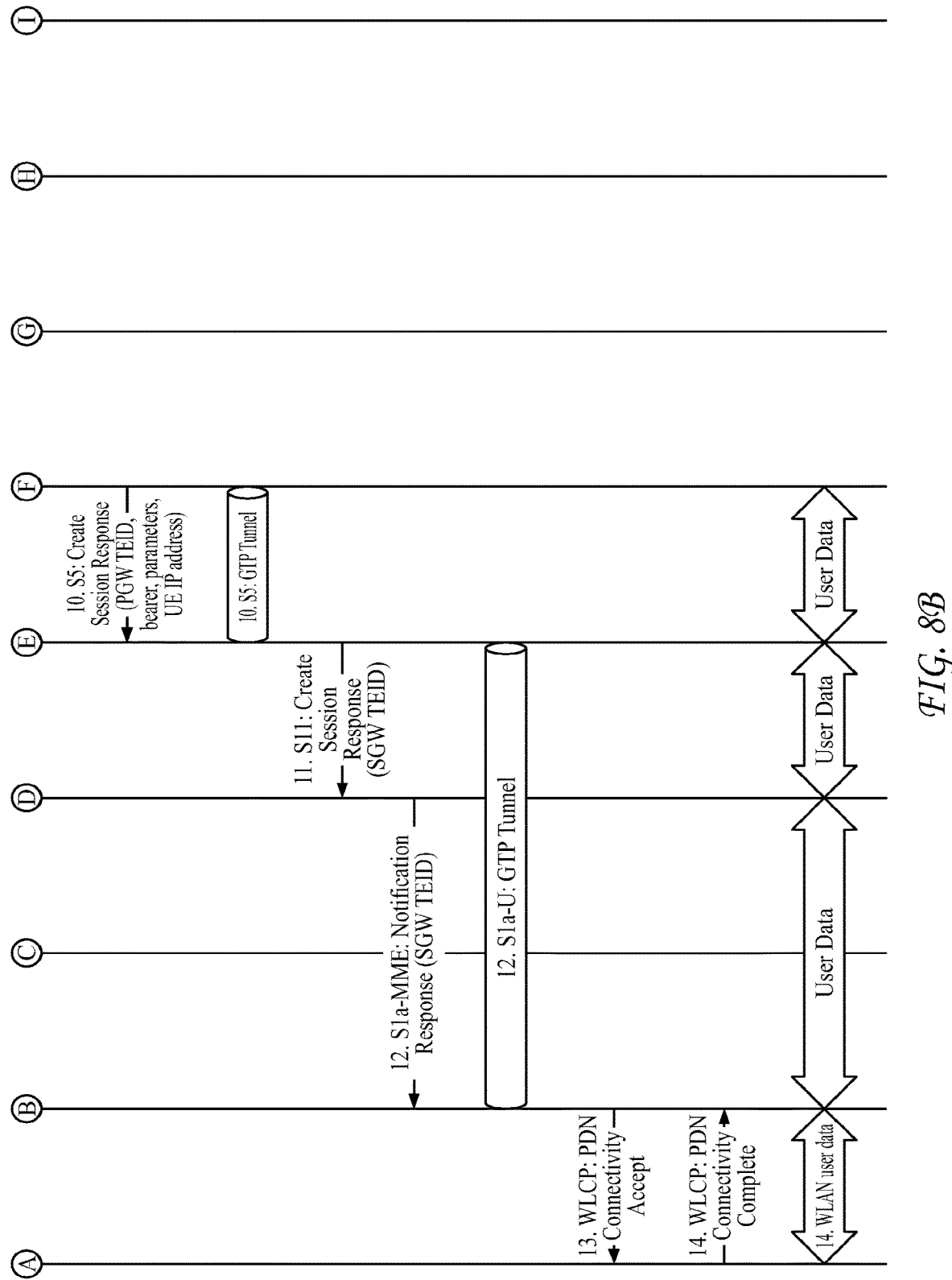

FIGS. 8A-B depict exemplary message flow associated with the MME 534 orchestrated path formation between the TWAN 522 and PGW 522. Referring to FIG. 8A, at step 0, the transport network layer (TNL) connection is established, or confirmed to have been established between TWAN and MME, e.g., via OAM. The 3GPP AAA Server is configured with and maintains information about the ISW-enabled MMEs, ISW-enabled SGWs, and ISW-enabled TWANs.

At step 1 of FIG. 8A, the UE 562 associates to a WiFi access point (AP) 510 that is part of an operator's Trusted WLAN Access Network (TWAN) 512. Association occurs via standard IEEE 802.11 procedures via the SWw interface. The UE 562 may discover and attempt association with a particular WiFi AP 510 based on pre-configured information, ANDSF policies, ANQP signaling, etc.

At step 2, EAP authentication is performed using existing standard procedures. The EAP payload contains an indication triggering use of the WLCP-based protocol as per the SaMOG phase 2 solutions described in 3GPP TR 23.852, the contents of which are hereby incorporated by reference in its entirety.

At step 3, the UE 562 requests a PDN Connection based on the SaMOG phase-2 "WLAN Control Protocol" (WLCP). More specifically, the UE 562 communicates the "PDN Connectivity Request" message to the WLAN AN 510. In an example embodiment, the message may comprise, for example, a PDN connectivity request message identity, a procedure transaction identity, a request type identifying the request is an initial request, a PDN type, an access point name (APN), protocol configuration options, and related information elements. In the embodiment of FIG. 8, it is assumed that the WLCP is terminated by in the WLAN AN 510. The processing may be different in the scenario where the WLCP is terminated at the Trusted WLAN Access Gateway (TWAG) 560.

At step 4, the WLAN AN 510 generates and transmits a "Notification Request" message to the MME 534 over the S1a-MME interface 590. In an example embodiment, the message may comprise, for example, a RAT type, a WLAN AN tunneling end point identifier (TEID) for the control plane, a WLAN AN address for the user plane, a WLAN TEID of the user plane, an EPS Bearer identity, a default EPS Bearer QoS, charging characteristics, an initial Attach indication, a WLAN Identifier, and the UE Time Zone. The message may be communicated using extensions to the GTPv2-C based protocol. The RAT type indicates the non-3GPP IP access technology type (e.g. ISW-WLAN). The TWAN Identifier includes the SSID of the access point to which the UE is attached and also the BSSID. The EPS Bearer Identity and Default EPS Bearer QoS parameters convey the S1a bearer identity and the default S1a bearer QoS.

At step 5, the MME 534 may perform location update procedure and subscriber data retrieval from the HSS 570. This requested information may be used by the MME 534 to determine whether or not the UE may be granted access to the PGW 522 in view of the previous authentication between the UE and the HSS noted in Step 2.

At step 6, the MME 534 sends a "Create Session Request" message to the Serving GW over the S11 interface. The message may comprise, for example, an APN, IMSI, RAT type, BSSID, SSID, and any other information that is suitable.

At step 7, the SGW 538 communicates a "Create Session Request" message to the PGW 522 over the S5 interface.

At step 8, if dynamic policy and charging control (PCC) is implemented, the PGW 522 communicates the session establishment to the Policy and Charging Rules Function (PCRF) 594 in order to retrieve the QoS and charging rules. The PGW 522 may thereafter enforce the rules. If dynamic PCC is not implemented, such rules may be pre-configured in the PGW 522.

As shown in FIG. 8A, at step 9, the PGW 522 uses the S6b interface 596 to update the 3GPP AAA Server 518 with the associated PGW connectivity information for the UE 562. The PGW 522 also provides the associated SGW 538 information. The 3GPP AAA Server 518 subsequently updates the HSS 570 with the received information via the SWx interface 580.

Referring to FIG. 8B, at step 10, the PGW 522 returns "Create Session Response" message to the SGW 538 over the S5 interface 540. The message may comprise, for example, the allocated UE IP address, a PGW address for the user plane, a PGW TEID of the user plane, a PDN GW TEID of the control plane, a PDN Type, a PDN address, an EPS bearer identify, an EPS Bearer QoS, an APN-AMBR, and any additional suitable parameters. At this point in the processing, the GTP tunnel between the PDN GW and Serving GW has been established.

At step 11 of FIG. 8B, the SGW 538 communicates the "Create Session Response" message to the MME 534 over the S11 interface. The message may comprise, for example, an S-GW address for the user plane, an S-GW TEID of the user plane, and an allocated UE IP address.

At step 12, the MME 534 communicates a "Notification Response" message to the WLAN AN 510 over the S1a-MME interface 590. In an example embodiment, the message may comprise, for example, the S-GW address for the user plane, an S-GW TEID of the user plane, and an allocated UE IP address. At this point in the processing, the GTP tunnel between the Serving GW and the WLAN AN has been established.

At step 13, the WLAN AN 510 communicates the successful establishment of the PDN connection to the UE 562 via the WLCP-based message "PDN Connectivity Accept" over the SWw interface. The message may comprise, for example, the PDN connection ID to identify the PDN connection between the UE 562 and the WLAN AN 510 and a MAC address of the WLAN AN 510. This MAC address may be used by the UE 562 and the WLAN AN 510 to send the user plane packets for this PDN connection.

At step 14, the UE 562 communicates a WLCP-based "PDN Connectivity Complete" message to the WLAN AN 510. At this point in the processing, a complete path between the UE 562 and the PGW 522 has been established. The WLAN AN may now route packets between the UE 562 and PGW 538 via the WLAN AN 510 and SGW 538.

MME-Initiated Handover from (H)eNB to Trusted WLAN

The processing described above in connection with FIG. 8 relates to various scenarios whereby a UE attaches to a PDN via a TWAN. In the instance where a UE has attached to a PDN, it may be useful to hand over a connection to the PDN to another of the wireless access networks, i.e. WiFi and cellular LTE access networks. For example, where a UE has an established connection to a PDN via HeNB/LTE, the MME 534 may determine to hand over the communication to the PDN to a WLAN connection that the UE has with the PDN.

Figure 9A:
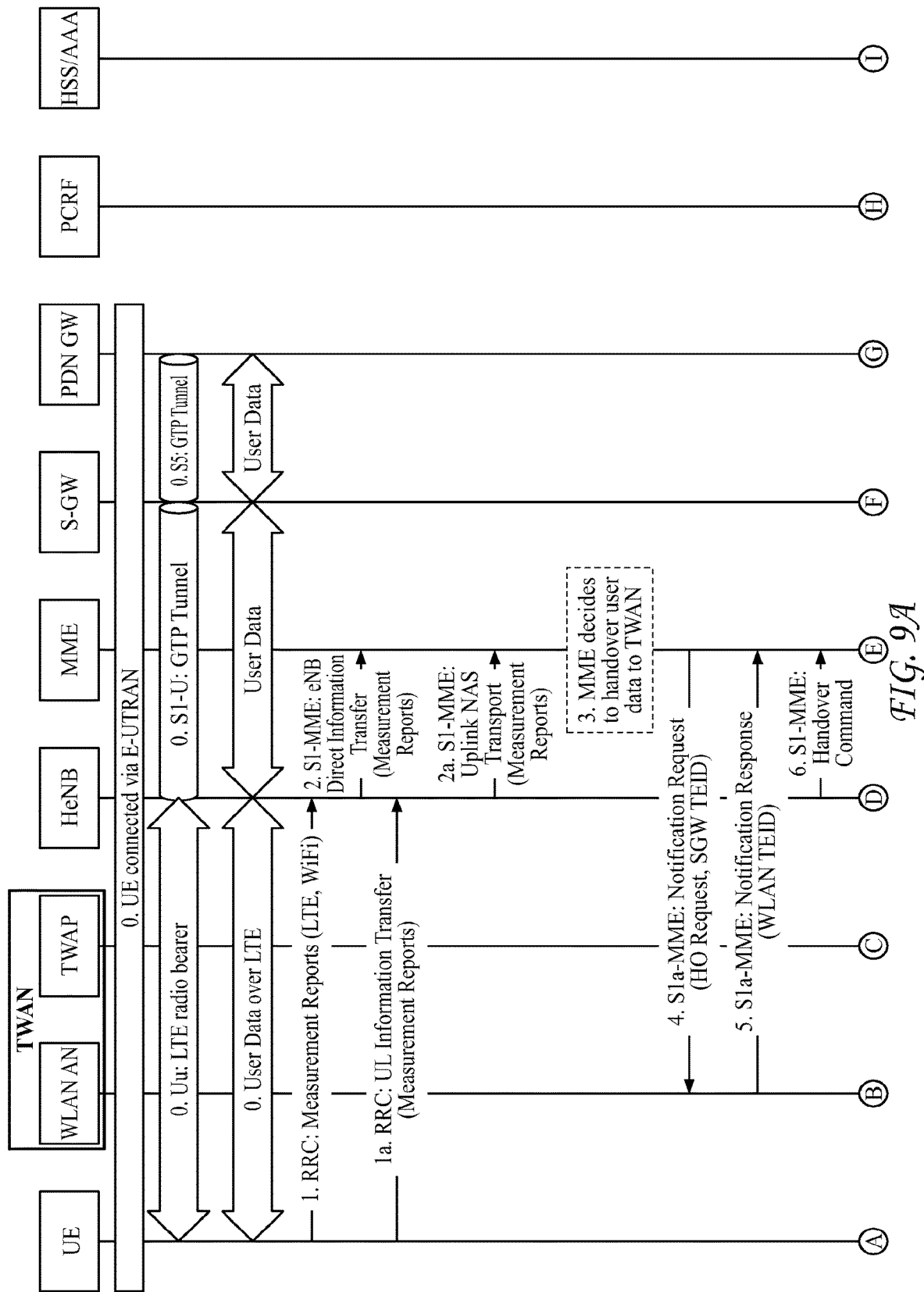
FIGS. 9A-B depict a diagram depicting example processing associated with a handover of a connection from an HeNB/LTE network to TWAN.
Figure 9B:
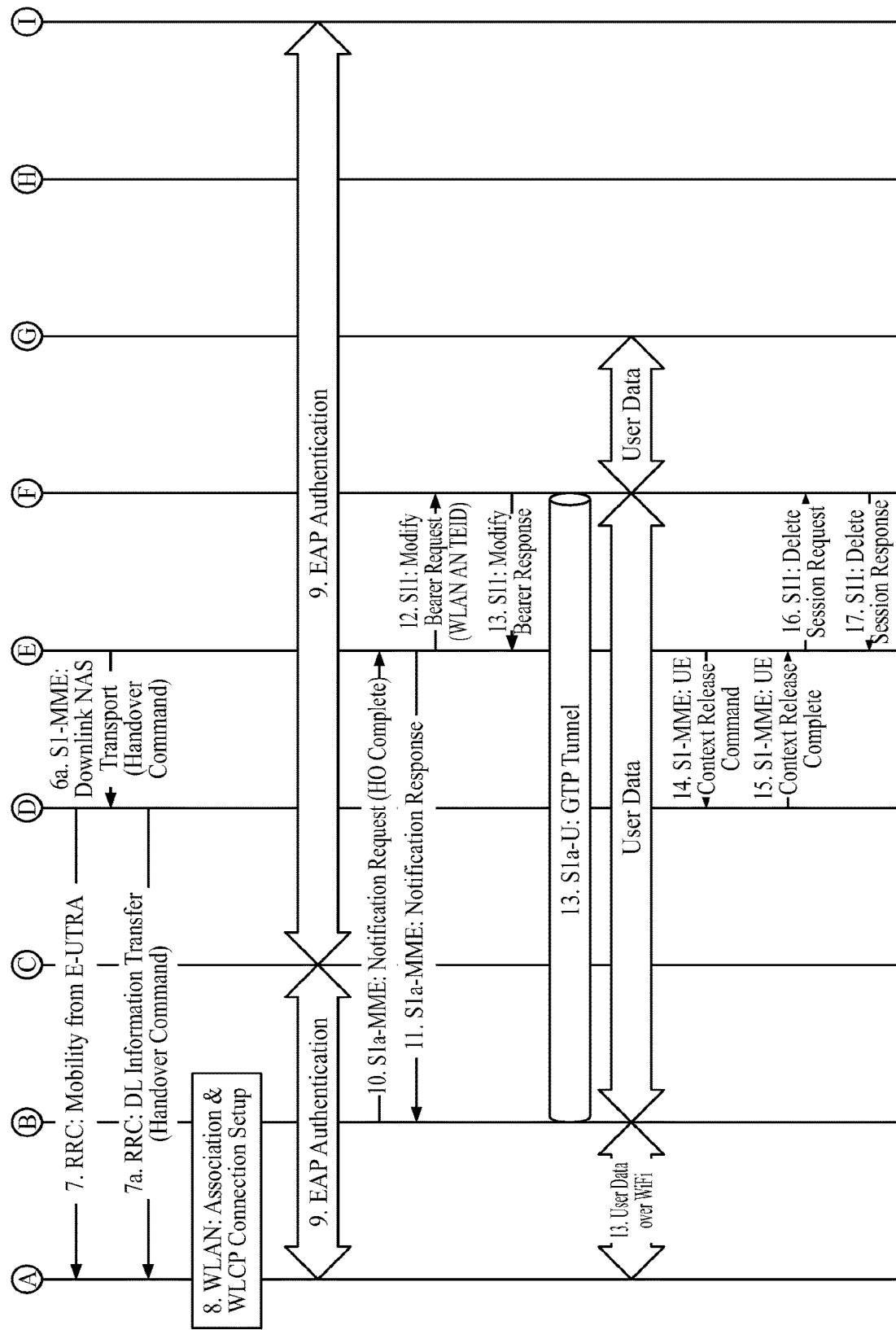

FIGS. 9A-B depict example processing associated with handing over a communication path from an existing HeNB/LTE connection to a WLAN connection. The UE attaches via TWAN to establish a connection to a PDN that it is already connected to via LTE. In the example scenario of FIGS. 9A-B, the source (H)eNB/LTE network and target TWAN are both controlled by the same ISW-enabled MME 534 and served by the same standalone ISW-enabled SGW 538. Once the TWAN connection is established, the UE 562 releases the associated HeNB/LTE connection thereby completing a handover from HeNB/LTE to TWAN.

Given that the IP session is not changed during the handover, its associated parameters (e.g., QoS) are unchanged as the wireless bearer is transported either via WiFi or LTE protocol. Accordingly, some of the core network entities such as, for example, the PGW 522, do not need to know about the MME handover decision. Even for charging purposes, we can assume that the UE subscription plan defines specific QoS to be achieved either over WiFi or LTE links. The UE does not care about the air interface as long as he is receiving the promised QoS.

Referring to FIG. 9A, at step 0, an ongoing session has been established over (H)eNB access. It is assumed that an LTE data radio bearer already exists between the UE 262 and the (H)eNB 595. Moreover, two GTP-U user data tunnels exist, namely, (H)eNB to/from S-GW and SGW to/from PDN GW.

At step 1 of FIG. 9A, the (H)eNB receives "RRC: Inter-system Measurement Reports" from the UE 562. Using existing technologies, the UE 562 can be requested to perform inter-system measurements of UTRA, GERAN, or CDMA2000 frequencies such as is described in 3GPP TS 36.331, the contents of which are hereby incorporated by reference herein in their entirety. In the embodiments disclosed herein, the UE 562 may also collect and communicate the measurements described above including, for example, RCPI, RSNI, BSS Load, and WAN metrics. In general, the reported WiFi measurements represent multiple WiFi access points such as, for example, those access points whose RSSI is above a certain threshold.

At step 2, the (H)eNB 595 forwards the measurement reports to the MME 534 by sending the message "eNB Direct Information Transfer (Measurement reports)" over the S1-MME interface. The message typically contains the same measurements information as sent by the UE 562 to the (H)eNB 595.

In another example embodiment, which is designated step 1a in FIG. 9A, the measurements may be sent via a newly proposed NAS "Measurement Report" message that is transported from the UE 562 to the MME 534 via the (H)eNB 595 using the "RRC: UL Information Transfer" message containing the measurement reports.

In still another example embodiment, which is designated step 2a in FIG. 9A, the (H)eNB 595 may forward the measurement reports to the MME 534 via the "Uplink NAS Transport" over the S1-MME interface.

At step 3, based on the measurement reports collected from the LTE HeNB 595 and WiFi network 512, the MME 534 determines either to handover to WiFi/TWAN 512 or to continue using the HeNB/LTE air interface 595. Accordingly, the processing is an MME-based network-initiated handover. The MME 534 determines to initiate a handover to WiFi/WLAN 512.

At step 4, the MME 534 communicates a handover request to the TWAN 512 by transmitting a "Notification Request" message to the WLAN AN 510 over the S1a-MME interface 590. The message may comprise, for example, an SGW address, an SGW TEID, a PGW ID, an APN, and HO request. The message may comprise the TEID and address of the SGW 538 which is used by the WLAN AN 510 for an uplink data transmission.

At step 5, the WLAN AN 510 communicates a "Notification Response" message to the MME 534 over the newly proposed S1a-MME interface 590 indicating the status of the HO. The message may comprise, for example, a WLAN AN address, a WLAN AN TEID, and a HO status. The HO status is usually a "success" status, unless the WLAN AN is not admitting any additional UEs.

At step 6 of FIG. 9A, the MME 534 communicates a "Handover Command" message to the (H)eNB 595. The message informs the (H)eNB 595 to perform a handover.

Referring to FIG. 9B, at step 7, the (H)eNB 595 commands the UE 562 to make a handover using a "Mobility from E-UTRA" message. This message is perceived by the UE 562 as a "Handover Command" message.

In an alternative embodiment, which is designated as step 6a in FIG. 9B, a newly proposed NAS "Handover (HO) Command" message may be communicated from the MME 534 to the UE 562 via the (H)eNB 595 using the "Downlink NAS Transport" message over the S1-MME interface 590. At step 7a, the handover (HO) command message is forwarded to the UE 562 by the (H)eNB 595 using an "RRC: DL Information Transfer" message.

In an example embodiment, the UE 562 may be programmed to provide an indication that a transfer or handover is taking place. For example, the UE 562 may be programmed, in response to receiving a command to implement a handover, to present a user interface informing the user of the handover or requesting permission from the user to proceed with the handover. For example, the UE 562 may be programmed to present user interfaces such as depicted in FIGS. 10A and 10B. As shown, in FIG. 10A, the UE 562 may generate and display a user interface providing notice that a switch between access networks, i.e., LTE and WiFi, will be taking place. As shown, the user interface may identify the switch that is being proposed and provide a user interface feature such as a selectable button that the user may depress to indicate that the switch is acknowledged. In an alternate embodiment, the UE 562 may be programmed to generate and display a user interface that requests input from the user authorizing a switch between access networks. For example, a user interface such as is depicted in FIG. 10B may be generated by UE 562. As shown, the user interface may identify the switch between access networks that is being proposed (e.g., from WiFi to LTE or from LTE to WiFi) and provide user interface features such as selectable buttons that the user may depress to indicate that the requested switch is authorized. In the example embodiment of FIG. 10B, the user interface may provide selectable buttons with which the user may select to either agree to the proposed switch or select not to authorize the proposed switch. If the UE 562 receives input indicating the user agrees to the proposed switch, processing continues as described below. However, if the UE 562 receives input indicating the switch is not authorized, processing further to performing the proposed switch may be terminated.

In the instance where continued processing of the handover is authorized, at step 8, the UE 562 obtains an IPv4 address to be used for WLCP transport. It is assumed that, in order to identify the UE 562, the L3 attach request is transported in an L2 frame that contains the UE L2 address (MAC address) as described in 3GPP TS 23.402, the contents of which are hereby incorporated herein in its entirety.

At step 9 of FIG. 9B, the UE 562 discovers the trusted WLAN 512 and performs access authentication and authorization. The WLAN identity (SSIS, BSSID, etc.) may be provided by the MME in the HO Command.

At step 10, the WLAN AN 510 generates and transmits a "Notification Request" message (HO complete) to the MME 534 over the newly proposed S1a-MME interface 590. The message indicates the handover procedure is complete and that the UE 562 is already connected to the WLAN AN 510.

At step 11, the MME 534 responds by communicating a "Notification Response" message to the WLAN AN 510 over the newly proposed S1a-MME interface 590 to acknowledge receiving the notification message.

At step 12, the MME 534 generates and transmits a "Modify Bearer Request" message to the Serving GW 538 for each PDN connection. The message may comprise, for example, a WLAN AN 510 address and TEID for downlink traffic on the S1a-U 592 as provided in Step 5.

At step 13, the SGW 538 returns a "Modify Bearer Response" message to the MME 534. At this step in the processing, the S1a-U GTP-based user data tunnel is now established. Data can be sent over the new WiFi path now. Data received at the WLAN AN 510 may be communicated over S1a-U interface 592 to SGW 595, which communicates the data to the PGW 522.

At step 14, the MME 534 releases the UE context in the (H)eNB 595 by communicating a "UE Context Release Command" message to the (H)eNB 595.

At step 15, the (H)eNB 595 releases its bearer resources related to the UE 562 and responds with a "UE context Release Complete" message.

At step 16, the MME 534 releases the EPS bearer resources in the SGW 538 by communicating a "Delete Session Request" message, which includes an Operation Indication Flag, to the SGW 538. If the Operation Indication Flag is not set, this indicates to the SGW 538 that the SGW shall not initiate a delete procedure towards the PGW 522 as described in 3GPP TS 23.401, the contents of which are hereby incorporated by reference in its entirety.

At step 17, the SGW 538 acknowledges resource removal by communicating a "Delete Session Response" message.

MME-initiated Handover from Trusted WLAN to (H)eNB

In the processing described in connection with FIGS. 9A-B, a handover is performed of a communication path from an existing HeNB/LTE connection to a WLAN connection. Of course, the MME 534 may determine to handover communication from the WLAN to a HeNB/LTE connection.

Figure 11A:
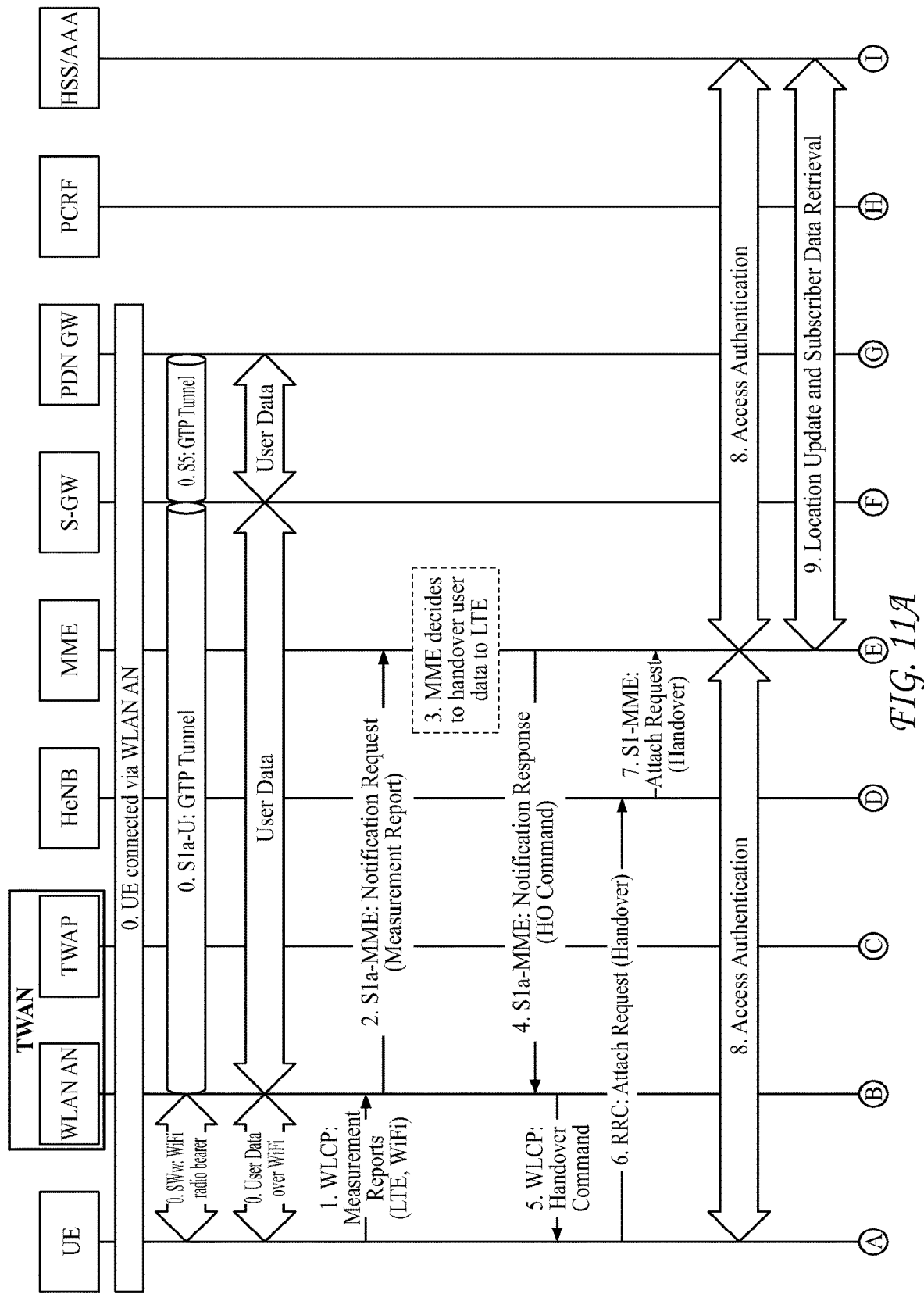
FIGS. 11A-B depict a diagram depicting example processing associated with a handover of a connection from a TWAN to an HeNB/LTE network.
Figure 11B:
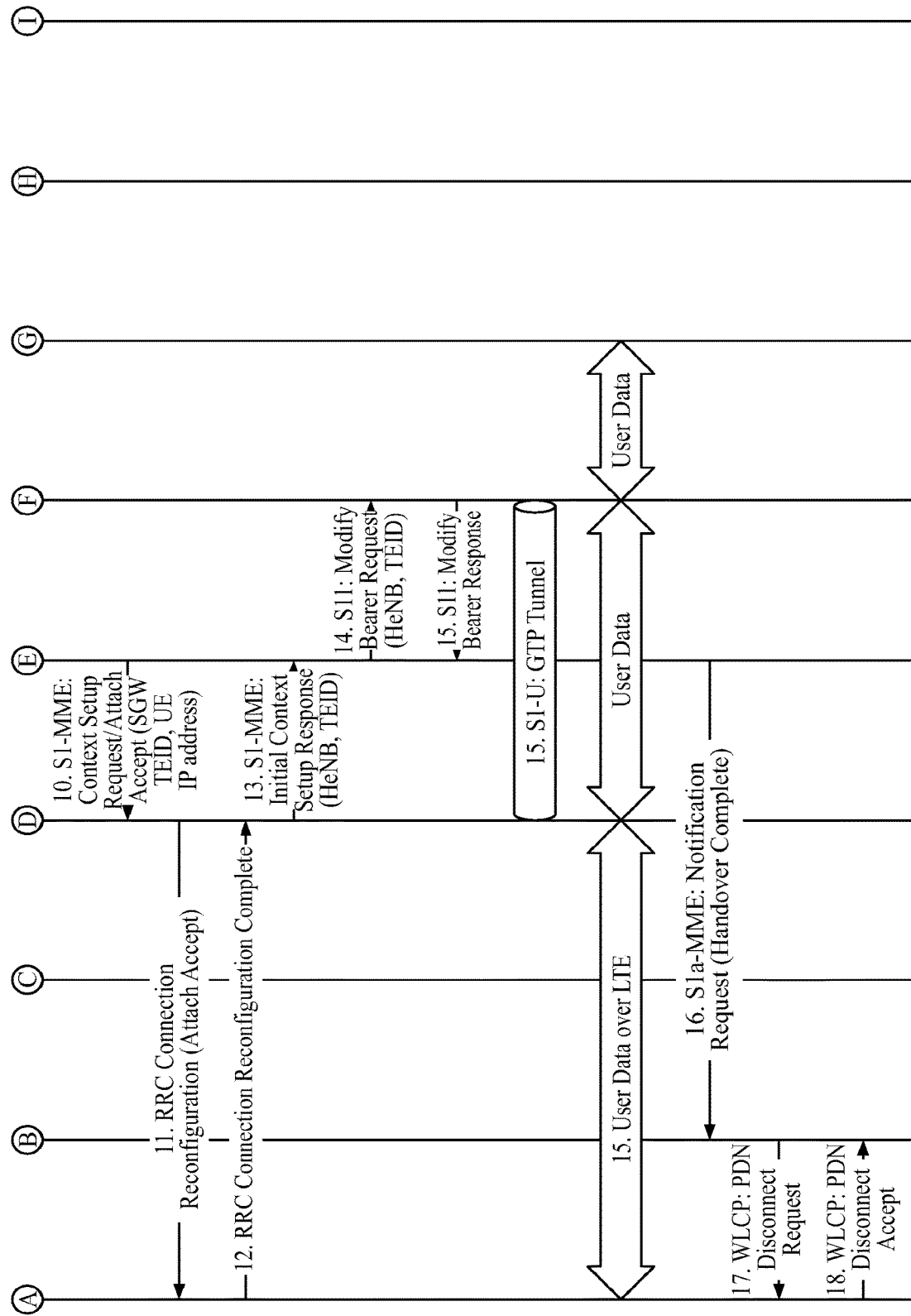

FIGS. 11A-B depict example processing associated with handing over a communication path from an existing WLAN connection to an HeNB/LTE connection. The UE attaches via HeNB to establish a connection to a PDN that it is already connected to via the TWAN. In the example scenario of FIGS. 11A-B, the source (H)eNB/LTE access network and TWAN are both controlled by the same ISW-enabled MME 534 and served by the same standalone ISW-enabled SGW 538. Once the HeNB connection is established, the UE 562 releases the associated TWAN connection thereby completing a handover from the TWAN to HeNB/LTE.

Referring to FIG. 11A, at step 0, an ongoing session has been established over trusted WiFi access. It is assumed that a WiFi over the air transmission already exists between the UE and the WLAN AN. Moreover, two GTP-U user data tunnels exist, one from WLAN AN 510 to/from SGW 538 and a second from SGW 538 to/from PGW 522.

At step 1 of FIG. 11A, the UE 562 generates and communicates a new message, namely, "Measurement Reports," which is incorporated into the WLCP protocol, to the WLAN AN 510. In an example embodiment, the Measurement Reports message comprises the WiFi measurements noted above in Table 2 along with LTE neighbor list measurements.

At step 2, the WLAN AN 510 communicates the Measurement Reports to the MME 534 using the "Direct Transfer Request" message over the newly proposed S1a-MME interface 590. This message may comprise, for example, the same measurement information sent by the UE 562 to the WLAN AN 510 in step 1.

At step 3, using the Measurement Reports collected from the WiFi (WLAN) and LTE sides, the MME 534 decides either to handover communication to the HeNB/LTE connection or to continue using the WiFi (WLAN) air interface. In the example scenario related to FIG. 11, the MME 534 determines to have a handover to the LTE access network based upon the measurement report information.

At step 4, the MME 534 sends a "Direct Transfer Request" message, which may also be referred to as a "Handover Command" message, to the WLAN AN 510. In an example embodiment, the message may comprise an SGW address, S1a-U uplink TEIDs; and an HO status. The message provides the WLAN AN 510 with the data identifying S1a-U uplink TEIDs allocated at the SGW 538.

At step 5, the WLAN AN 510 forwards a newly defined "Handover Command" message to the UE 562 using the WLCP protocol to inform the UE 562 to start the attachment procedure with the (H)eNB 595.

Similar to the processing described above in connection with FIG. 9, the UE 562 may be programmed to generate one or more user interfaces similar to those depicted in FIGS. 10A and 10B providing notice of an impending switch of access networks or requesting authorization for performing the switch.

At step 6, the UE 562 generates and transmits an "RRC: Attach Request" message to the (H)eNB 595 with a "Handover" indication.

At step 7, the (H)eNB 595 communicates the "Attach Request" message to the MME 534.

At step 8, the MME 534 may contact the HSS 570 and authenticate the UE 562 as described in 3GPP TS 23.401, the contents of which are hereby incorporated herein by reference in their entirety.

At step 9 of FIG. 11A, after successful authentication, the MME 534 may perform location update procedures and subscriber data retrieval from the HSS 570 as specified in TS 23.401.

Steps 10-13 of FIG. 11B are similar to steps 17-20 of the E-UTRAN initial attachment procedure described in Section 5.3.2.1 of 3GPP TS 23.401, the contents of which are hereby incorporated herein by reference in its entirety. It will be appreciated, however, that in step 10, the MME 534 communicates the SGW 538 TEID to the (H)eNB 595 in addition to the UE IP address. In response, at step 13, the (H)eNB 595 communicates the (H)eNB TEID to the MME 534.

At step 14 of FIG. 11B, the MME 534 generates and transmits a "Modify Bearer Request" to the SGW 538 for each PDN connection. The message may comprise, for example, the (H)eNB address and TEID for downlink traffic on the S1-U interface.

At step 15, the SGW 538 returns a "Modify Bearer Response" message to the MME 534. At this step in the processing, the S1-U GTP-based user data tunnel has been established. The communication path over the LTE access network is available to communicate data. Data received at the HeNB 595 may be communicated over S1-U interface 598 to SGW 595, which communicates the data to the PGW 522.

At step 16, the MME 534 generates and communicates a "Notification Request (Handover Complete)" message to the WLAN AN 510 to inform it of the handover completion.

At step 17, the WLAN AN sends the "WLCP: PDN Disconnect Request" to the UE 562 to release the UE-TWAN connection.

At step 18, the UE 562 acknowledges the release by communicating a "WLCP: PDN Disconnect Accept" message to the WLAN AN 510.

ISW GW Based Inter-System Handover

In the systems described above in connection with FIGS. 5-11, inter-system attachments and handovers are managed and initiated by MME 534. According to another embodiment, an integrated small cell and WiFi (ISW) gateway (GW) may initiate and manage handover operations. The ISW GW is integrated with a mobility management entity (MME) and serving gateway (SGW) and has interfaces with both the 3GPP access network and the TWAN. The ISW GW operates as a common control gateway and a common user gateway for both LTE access networks and TWANs. User equipment (UE) by means of the ISW GW is able to access the capabilities of a packet data network (PDN) through either the LTE access network or TWAN. Further, the ISW GW initiates and manages handing over an existing communication connection between a UE and a PDN from one of the LTE access network or TWAN to the other.

Architecture for ISW GW Based Network-Initiated Handover

Figure 12:
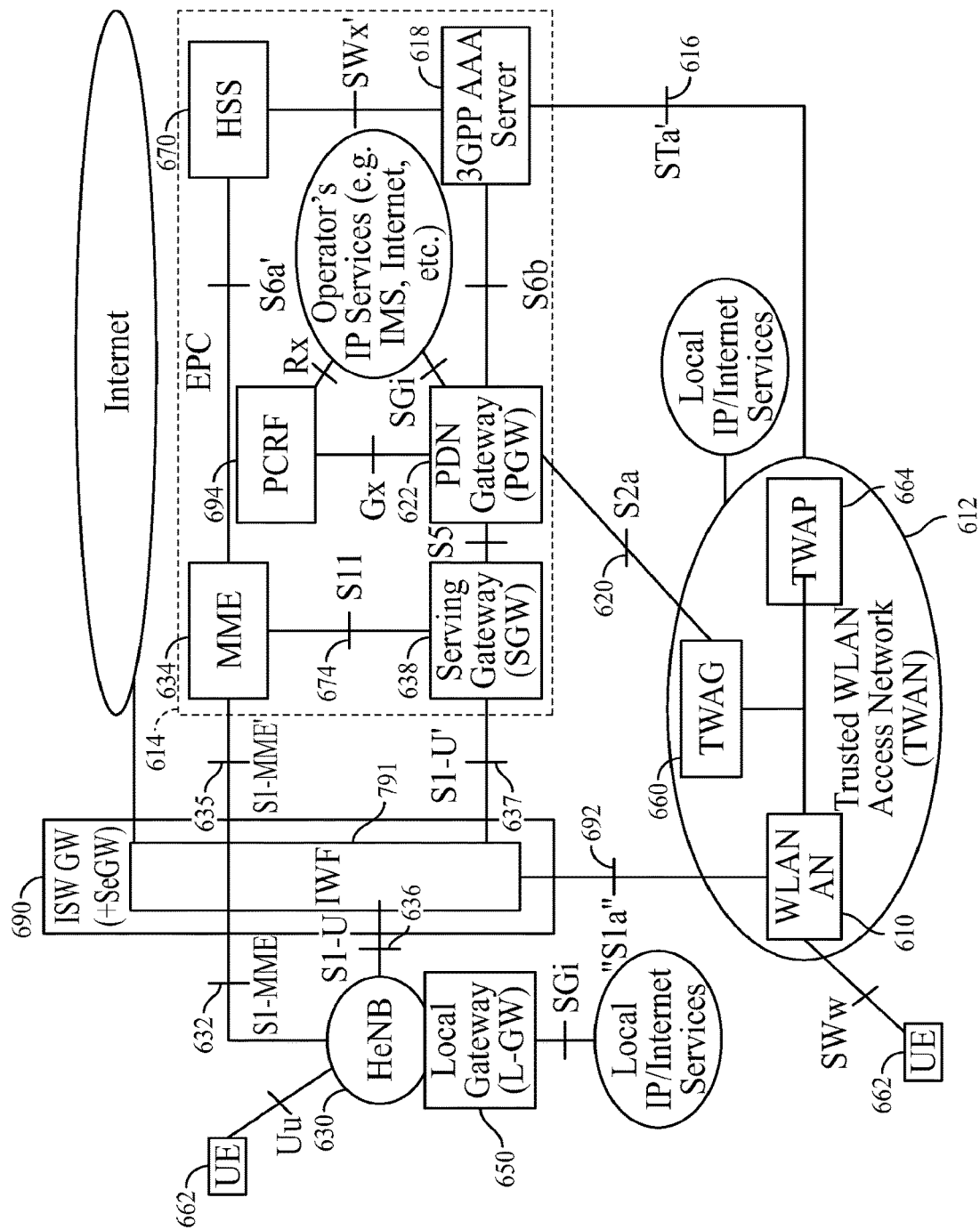
FIG. 12 depicts an example system for providing integrated HeNB/LTE and TWAN access to a PDN.

FIG. 12 depicts an example embodiment of an ISW GW based system for network-initiated handover of communication between WLAN and HeNB/LTE access networks. The ISW GW 690 provides a common control plane and user plane for both HeNB 630 and WLAN 612 access to the PDN of the EPC 614.

A new interface "S1a" 692 supports both control plane and user plane communications between the TWAN 612 and the ISW GW 690. In the example embodiment of FIG. 12, the interface S1a terminates in the WLAN AN 610 of TWAN 612. The S2a interface 620 may be used to support legacy deployments such as might arise when the UE 662 is not connected via an ISW-GW.

The ISW GW 690 interfaces with HeNB network 630 over control plane interface S1-MME 632 and user plane interface S1-U 236. It will be appreciated that in an example embodiment, ISW GW 690 incorporates functionality that has traditionally been provided by HeNB GW 152 (FIG. 1). ISW GW 690 may further provide functionality that has traditionally been provided by SeGW 157 and HeMS 155 (FIG. 1).

The ISW GW 690 interfaces with the MME 634 over S1-MME' control plane interface 635, and communicates with SGW 638 over S1-U' user plane interface 637. Control plane interface S1-MME' 635 operates substantially as prior S1-MME interfaces, but has been extended to accommodate the processing as described herein. The ISW GW 690 controls the setup of the GTP-U tunnels toward the HeNB. User plane interface S1-U' 637 operates substantially as prior S1-U interfaces, but has been extended to accommodate the processing as described herein.

With the S1a, S1-MME, S1-MME', S1-U, and S1-U' interfaces in place, the ISW GW 690 operates as a common control plane entity and user plane entity for both HeNB/LTE access network 630 and TWAN 612 access. ISW GW 690 relies upon MME 634 to provide common control plane services for HeNB/LTE access network 630 and TWAN 612 access, and relies upon SGW 638 to provide common user plane services for both HeNB/LTE access network 630 and TWAN 612 access. As described in detail below in connection with FIGS. 16A-B, the ISW GW 690 and integrated MME 634 and SGW 638 allow for user equipment (UE) 662 to access the capabilities of a packet data network (PDN) through either the HeNB/LTE access network 630 or TWAN 612. Moreover, and as described in detail in connection with FIGS. 17 and 18, an existing communication connection between a UE 662 and a PDN 622 may be handed over from one of the HeNB/LTE access network 630 or TWAN 612 to the other.

As noted above, interfaces S1-MME' 635 and S1-U' 637 operate consistent with previously existing interfaces S1-MME and S1-U but have been extended to provide the functionality as described herein. The SWw', Sta', SWx', and S6a' interfaces likewise operate consistent with existing protocols, but have been extended with additional information elements to support the disclosed functionality. Interfaces carrying extended protocols are denoted with an apostrophe (').

According to an aspect of the disclosed embodiments, the GTPv2-C and GTP-U protocols may be used over the new S1a interface 692, with appropriate extensions as required. The GTPv2-C based extensions are sufficient to implement the features disclosed herein. In an alternative embodiment, a new "S1a-AP" protocol based on the S1-AP protocol may be defined to convey the same information as the GTPv2-C extensions and may also use SCTP/IP instead of UDP/IP.

In an example embodiment, the transport network connection on the S1a interface 692 between trusted WLAN 612 and ISW-GW 690 may be established using extensions to Operation, Administration, and Maintenance (OAM) procedures. These and other OAM procedures may be implemented via trusted WLAN extensions to the TR-069 protocols as has previously been defined for a HeNB configuration.

Figure 13:
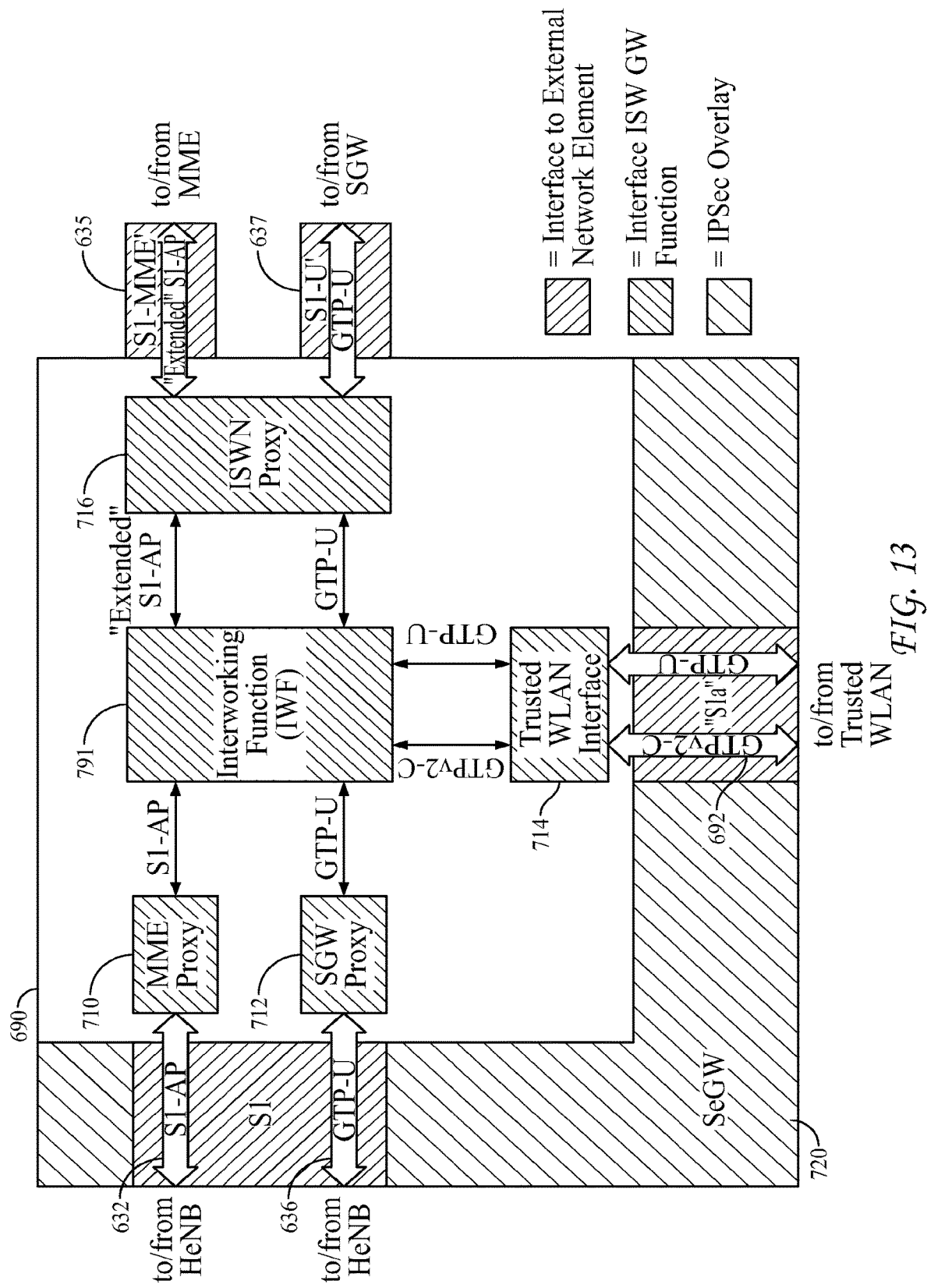
FIG. 13 depicts functional components of an integrated small cell and WiFi gateway (ISW GW).

FIG. 13 depicts a block diagram illustrating functional components of an ISW GW 690. The ISW-GW 690 lies between the HeNB 630 and MME 634. The ISW-GW 690 communicates with the HeNB 690 as if the ISW GW 690 were an MME 634. In other words, the ISW GW 690 transmits and receives standard HeNB-MME messages using the standard S1-AP protocol. Accordingly, as depicted in FIG. 13, ISW GW 690 comprises an MME proxy 710 which employs the standard MME stack and communicates with the HeNB 630 over the standard S1-MME reference point 632. One function of the MME proxy 710 is to receive the information from the HeNB 630 using S1-AP 632 and feed it to the Interworking Function (IWF) 791, which coordinates processing within the ISW GW 690. IWF 791 is adapted to provide traffic management and to route data between and amongst the TWAN 612, the HeNB 630, the MME 634, and SGW 638 as described below in connection with FIGS. 16-18.

The SGW proxy 712 operates in a similar manner to the MME proxy 710, but does so for the user plane.

The Trusted WLAN Interface or proxy 714 operates as a proxy for TWAN control and user planes. One function of the TWAN interface 714 is to convey the TWAN user/control planes to the IWF. In an example embodiment, the control plane may be communicated using the GTPv2-C tunneling protocol. The user plane may be communicated using the GTP-U tunnel protocol. Both user and control planes are carried over S1a interface reference point 612.

The IWF 791 communicates the control plane information of both the HeNB 630 and WLAN 612, via an ISW network (ISWN) proxy 716, to the MME 234. In other words, the ISWN proxy 716 is responsible for conveying the control plane information from the IWF 791 to the MME 634 over the S1-MME' reference point 635. Once the MME 634 has received the control plane information about the HeNB 630 and WLAN 612, the MME 634 may apply a traffic management policy. The policy could be derived from ANDSF information conveyed by the UE 662, HSS information received based on the UE's subscription, or local conditions perceived at the MME 634. The IWF 791 is primarily responsible for executing the traffic management policy and routing the user plane accordingly, either to the HeNB 630 or the TWAN 612. In the downlink, for example, if the WiFi air interface has a low congestion ratio and the MME 634 determines to utilize it instead of the LTE air interface, the MME 634 sends a decision to the IWF 791 via the ISWN proxy 716 in order to activate the WiFi path. As a result, the user plane is received at the IWF 791 from the SGW 638 and directed by the IWF 791 to the WLAN 610 via the TWAN interface 714.

In an example embodiment, a Security Gateway (SeGW) 720, which is a standard entity of the EPC architecture, may be added to the ISW-GW 690. It may be positioned at the interface between the HeNB/TWAN and the ISW-GW to guarantee the security of accessing the EPC.

Control Protocol Architecture in ISW GW Based Handover

Figure 14:
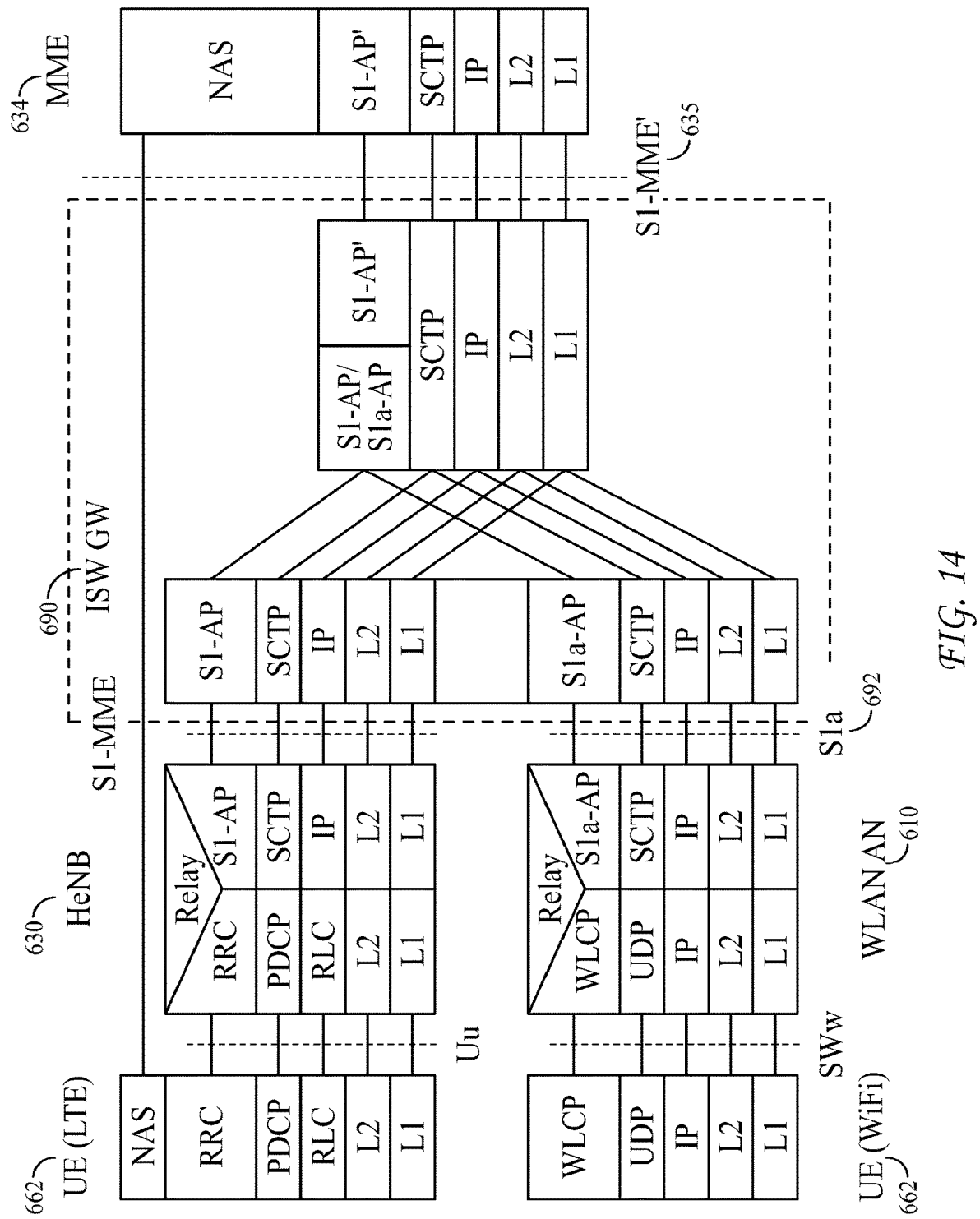
FIG. 14 depicts example protocol stacks for a control plane in a system comprising an ISW GW.

As noted from the above discussion, the disclosed systems and methods employ existing protocols and interfaces. However, in several instances, existing protocols and interfaces have been extended in order to support the disclosed processing. Further, in a few instances, new protocols and interfaces have been created. FIG. 14 depicts an example protocol stack consistent with the disclosed embodiments. As shown, the ISW-GW 690 communicates with the WLAN AN 610 via the newly proposed S1a-AP protocol over the newly proposed 51a interface 692. The ISW-GW 690 communicates with the HeNB 630 using the standard S1-AP protocol over the standard S1-MME interface. In the embodiment described above in connection with FIG. 6, the S1a-AP protocol was a GTPv2-C tunneling protocol, which is based on UDP. In the embodiment depicted in FIG. 14, the same protocol may be employed or another transport protocol which is based on SCTP, similar to the S1-AP protocol, may be employed. In the embodiment depicted in FIG. 14, the SCTP-based protocol stack is employed on the S1a interface 692. The ISW-GW 690 communicates with the MME 634 using the newly proposed S1-AP' protocol, which is also based on SCTP, over the newly defined S1-MME' interface 635. The S1-AP' is an extended version of S1-AP, carrying the information of S1-AP and S1a-AP protocols.

A more complete description of the messages along with the new/modified information elements are introduced below in Table 4. In Table 4, entries designated with an asterisk (*) are new messages and information elements. The message flows are further described in the context of the attach and handover processing as explained below in connection with FIGS. 16-18.

TABLE 4

Protocol extensions for ISW-GW based network architecture

| Protocol | Message Name | Message Direction | New/Modified Information Elements | Message Purpose |
|---|---|---|---|---|
| RRC (LTE over Uu) | Measurement Reports | UE to HeNB | LTE (*& WiFi) measurement reports | Carrying LTE & WiFi measurement reports to the HeNB |
| | Mobility from E-UTRA | HeNB to UE | — | HeNB informing the UE of the handover decision |
| S1-AP (SCTP over S1-MME) | eNB Direct Information Transfer | HeNB to ISW-GW | * Measurement Reports | Carrying LTE & WiFi measurement reports to ISW-GW |
| | Handover Command | ISW-GW to HeNB | — | ISW-GW informing HeNB of its decision to make handover |
| WLCP (WiFi over SWw) | *PDN Connectivity Request | UE to WLAN AN | Initial or Handover | Initiating connectivity request to PDN over WiFi |
| | *PDN Connectivity Accept | WLAN AN to UE | — | Indicating the acceptance of the request (initial or HO) |
| | *PDN Connectivity Complete | UE to WLAN AN | — | Acknowledgment of receiving the "Accept" notice |
| | *Measurement Reports | UE to WLAN AN | *LTE & WiFi measurement reports | Carrying measurements over WiFi to the WLAN AN |
| | *Handover Command | WLAN AN to UE | — | WLAN AN informing UE to make handover to LTE |
| S1a-AP (SCTP over S1a) | * Notification Request/Response | WLAN AN to ISW-GW | *WLAN AN TEID/Initial or HO request | Carrying tunnel-related (e.g. TEID) and other information (e.g. initial, HO request) |
| | | WLAN AN to ISW-GW | *Measurement Reports | Carrying LTE & WiFi measurements to the ISW-GW for HO decision |
| | | ISW-GW to WLAN AN | *ISW-GW TEID/HO Status | Carrying tunnel-related (e.g. TEID) and HO status |
| | | ISW-GW to WLAN AN | *HO Command | ISW-GW informing WLAN AN of a handover to LTE |
| | | WLAN AN to ISW-GW | *PDN Connectivity Complete | Informing the ISW-GW of PDN connectivity completion |
| | | WLAN AN to/from ISW-GW | *HO Complete | Indicating the completeness of the HO |
| | | ISW-GW to WLAN AN | — | Acknowledgement |

TABLE 4-continued

Protocol extensions for ISW-GW based network architecture
TABLE 4

| Protocol | Message Name | Message Direction | New/Modified Information Elements | Message Purpose |
|---|---|---|---|---|
| S1-AP' (SCTP over S1-MME') | *Notification Request/Response | ISW-GW to MME | *ISW-GW TEID | Carrying tunnel-related (e g. TEID) |
| | | MME to ISW-GW | *SGW TEID | Carrying tunnel-related (e g. TEID) |
| | | ISW-GW to MME | *PDN Connectivity Complete | Informing the MME of PDN connectivity completion |
| | | ISW-GW to MME | *HO Complete | Indicating the completeness of the HO |
| | | MME to ISW-GW | — | Acknowledgement |

User Plane Protocol Architecture in ISW GW Based Handover

Figure 15:
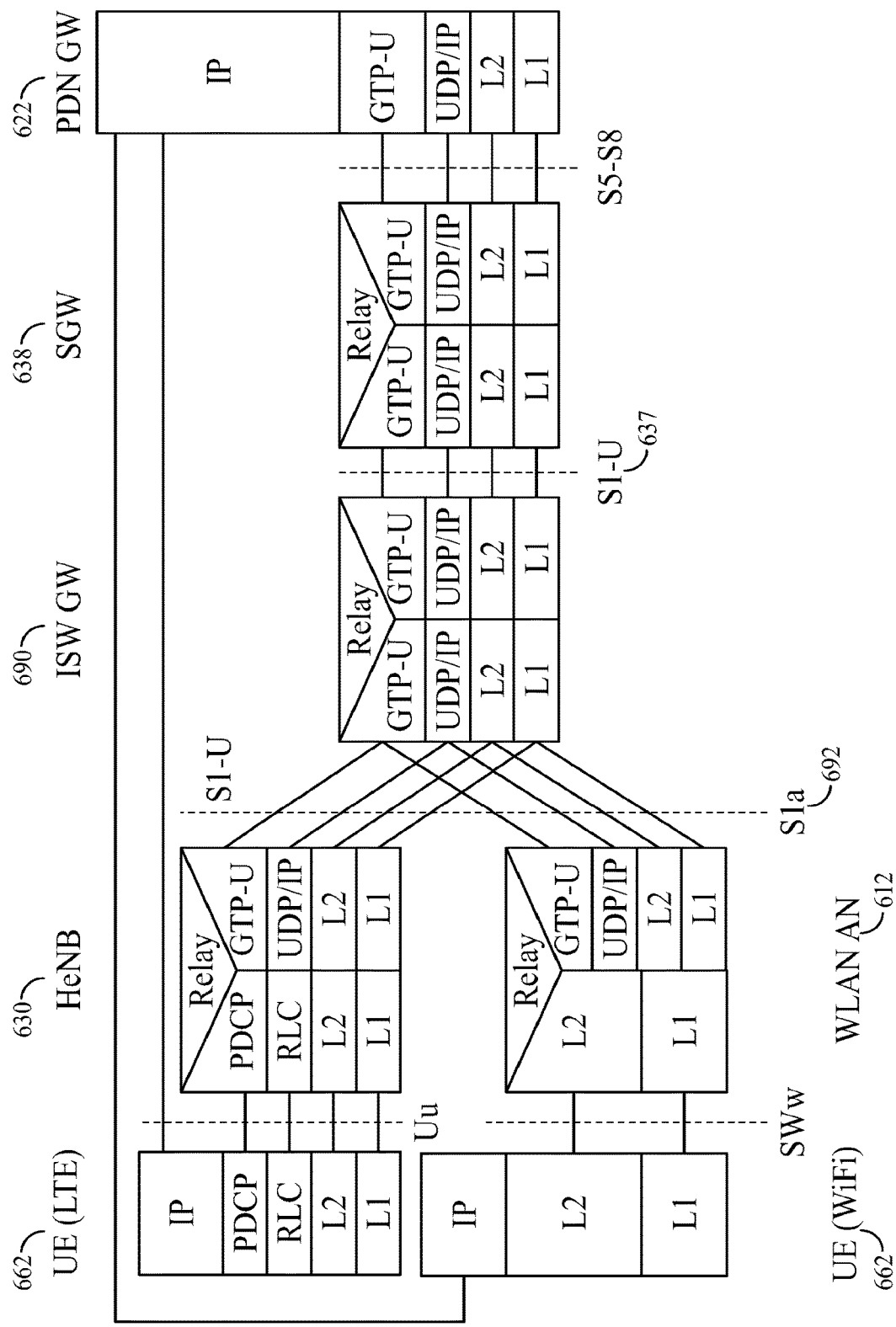
FIG. 15 depicts example protocol stacks for a user plane in a system comprising an ISW GW.

FIG. 15 shows the user plane protocol stack of the ISW-GW deployed network. The user plan protocol stack in an example ISW GW 690 embodiment is similar to that described above in connection with FIG. 7. In an example embodiment, the user plane protocol is different from the MME controlled embodiment in that the ISW GW 690 is positioned between the SGW 638 on one side and the HeNB 630 and the WLAN 612 on the other side.

GTP-U tunnels are constructed between the ISW-GW 690 from one side and the HeNB (over S1-U) or the WLAN AN (over S1a) from the other side. The S1-U interface carries the user plane to the SGW 638 over the GTP-based S1-U interface. The IP connection between the UE 662 and the PGW 622 is the same irrespective of the utilized air interface.

Trusted WLAN Initial Connectivity Via ISW-GW

The disclosed systems are adapted to establish a communication path to a PDN via the ISW GW 690. The ISW GW 690 is adapted to hand over a communication session initiated through the HeNB access network to the TWAN. The ISW GW 690 is likewise adapted to hand over a communication session initiated through the TWAN 612 to the HeNB access network 630. Processing associated with each of these is discussed below in connection with FIGS. 16-18.

Initial TWAN Connection to EPC Via ISW Gateway

Before a UE 662 may communicate with a PDN, the UE 662 must attach to the PGW 622. The disclosed ISW GW 690 is adapted to facilitate attaching via the TWAN 212.

Figure 16A:
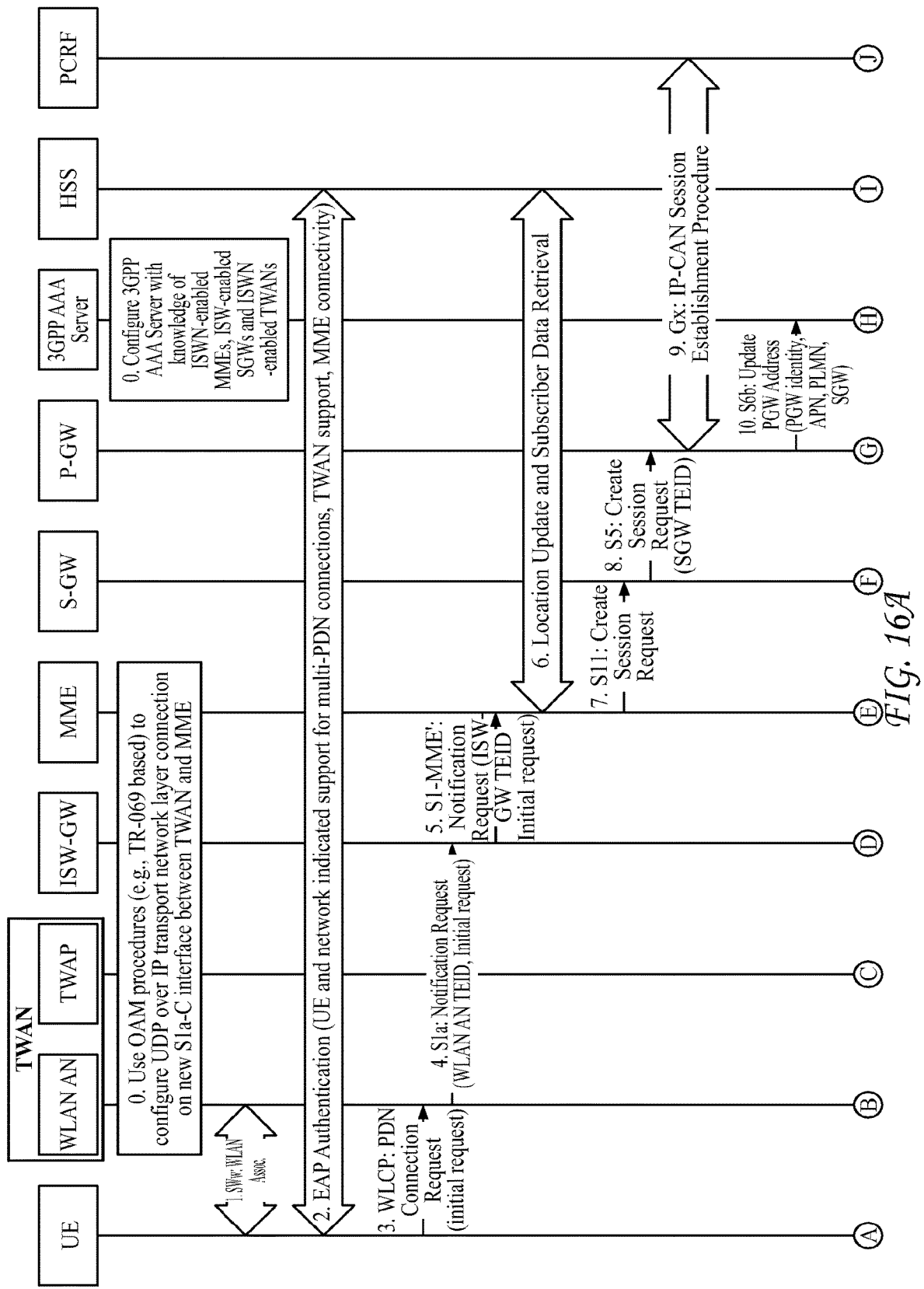
FIGS. 16A-B depict a diagram depicting example processing associated with a UE attaching via a TWAN to a PDN.
Figure 16B:
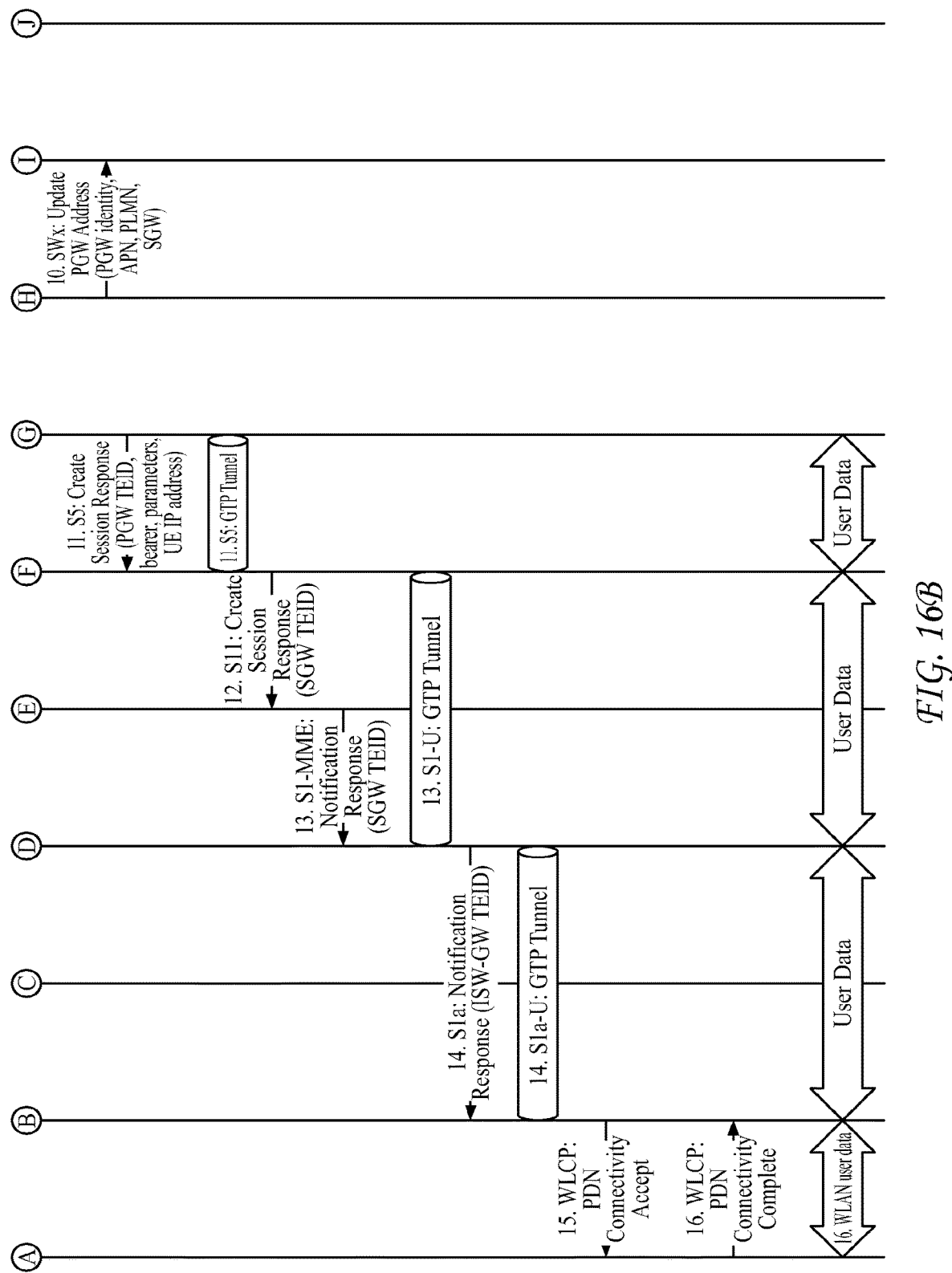

Generally, the attach processing involves the UE 262 connecting to the EPC 614 via Trusted WLAN 612 using the ISW GW 690. FIGS. 16A-B depict message flows for an initial PDN connectivity of the TWAN UE 662 using the ISW-GW 690. Steps 0, 1, 2, and 3 are the same as described above in connection with FIG. 8.

Referring to FIG. 16A, at step 4, the WLAN AN 610 generates and transmits a "Notification Request" message to the ISW-GW 690 over the newly proposed S1a-MME interface. The message may comprise, for example, a RAT type, a WLAN AN TEID of the control plane, a WLAN AN Address for the user plane, a WLAN TEID of the user plane, an EPS Bearer Identity, a Default EPS Bearer QoS, Charging Characteristics, an Initial Attach Indication, a WLAN Identifier, and the UE Time Zone. The message is communicated using the Sa1-AP protocol. The RAT type indicates the non-3GPP IP access technology type (e.g. ISW-WLAN). The TWAN Identifier includes the SSID of the TWAN to which the UE is attached, as well as the BSSID. The EPS Bearer Identity and Default EPS Bearer QoS parameters convey the S1a bearer identity and the default S1a bearer QoS.

At step 5 of FIG. 16A, the ISW-GW 690 communicates the "Notification Request" message to the MME 634 over the newly proposed S1-MME' interface 235. The communication may comprise the information received in the request from the WLAN AN 610.

At step 6, the MME 635 may perform a location update procedure with the HSS 670 and retrieve subscriber data from the HSS. The retrieved information may be used by the MME 634 in order to determine whether or not it may access to the PGW 522.

Steps 7-12 of FIGS. 16A-B, correspond to steps 6-11 described above in connection with FIG. 8.

At step 13 shown on FIG. 16B, the MME 635 communicates a "Notification Response" message to the ISW-GW 690 over the newly proposed S1-MME' interface 635. The message may comprise, for example, an SGW address for the user plane, an S-GW TEID of the user plane, and an allocated UE IP address. At this stage in the processing, the GTP tunnel between the SGW 638 and the ISW-GW 690 has been established.

At step 14 of FIG. 16B, the ISW-GW 690 communicates a "Notification Response" message to the WLAN AN 610 over the newly proposed S1a interface 692. The message may comprise, for example, an ISW-GW address for the user plane, an ISW-GW TEID of the user plane, and an allocated UE IP address. At this point in the processing, the GTP tunnel between the ISW-GW 690 and the WLAN AN 610 has been established.

At step 15, the WLAN AN 610 communicates that a successful PDN Connection has been establishment to the UE 662 via the WLCP-based message "PDN Connectivity Accept" over the SWw interface. The WLAN AN 610 incorporates into the message a PDN connection ID to identify the PDN connection between the UE 662 and the WLAN AN 610, and a MAC address of the WLAN AN. The MAC address may be used by the UE 662 and the WLAN AN 610 to transmit the user plane packets for this PDN connection.

At step 16, the UE 662 generates and communicates a "WLCP: PDN Connectivity Complete" message to the WLAN AN 610. At this point in the process, a complete path between the UE 662 and the PGW 622 has been established. The WLAN AN may now route packets between the UE 662 and PGW 622 via the WLAN AN 610 and the SGW 638.

ISW-GW-Initiated Handover from HeNB to Trusted WLAN

In some instances, it may be desired that an existing data flow between a UE 662 and a PDN via an HeNB 630 connection, to be handed over to a new connection path via a TWAN 612 connection. The ISW GW 690 is adapted to initiate a TWAN 612 attachment in order to establish a connection with a PDN to which the UE 662 is already connected to via the HeNB 630. Viewed in a different way, the ISW GW 690 initiates a bearer handover scenario. The ISW GW 690 receives measurement and performance statistics for both WiFi and LTE existing connections and determines whether it is best to utilize the LTE or WiFi. There is no need to involve any of the core network entities (e.g. MME 634) in making the handover decision. Hence this solution makes of the ISW-GW 690 a local inter-system mobility anchor.

Figure 17A:
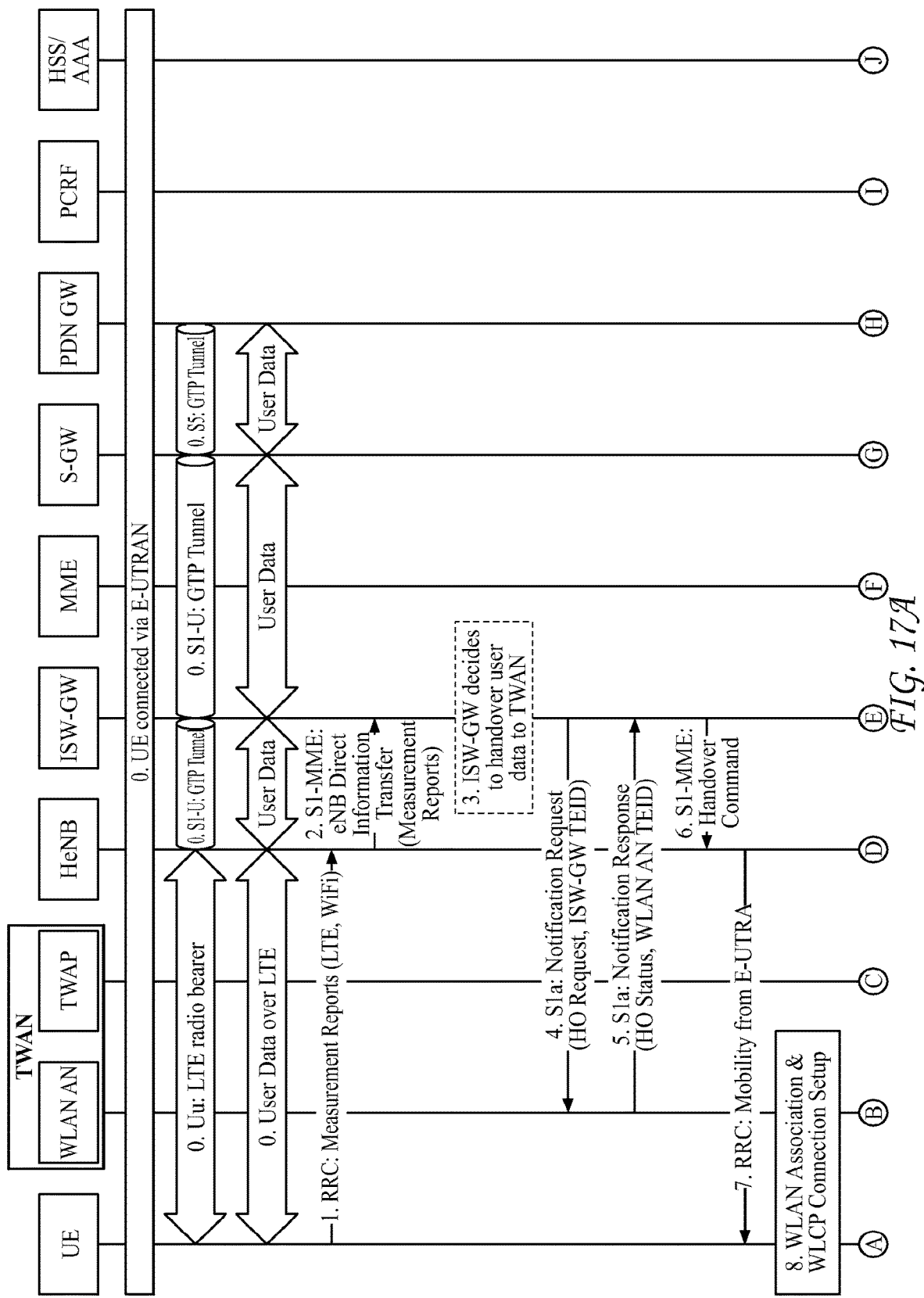
FIGS. 17A-B depict a diagram depicting example processing associated with a handover of a connection from an HeNB/LTE network to TWAN.
Figure 17B:
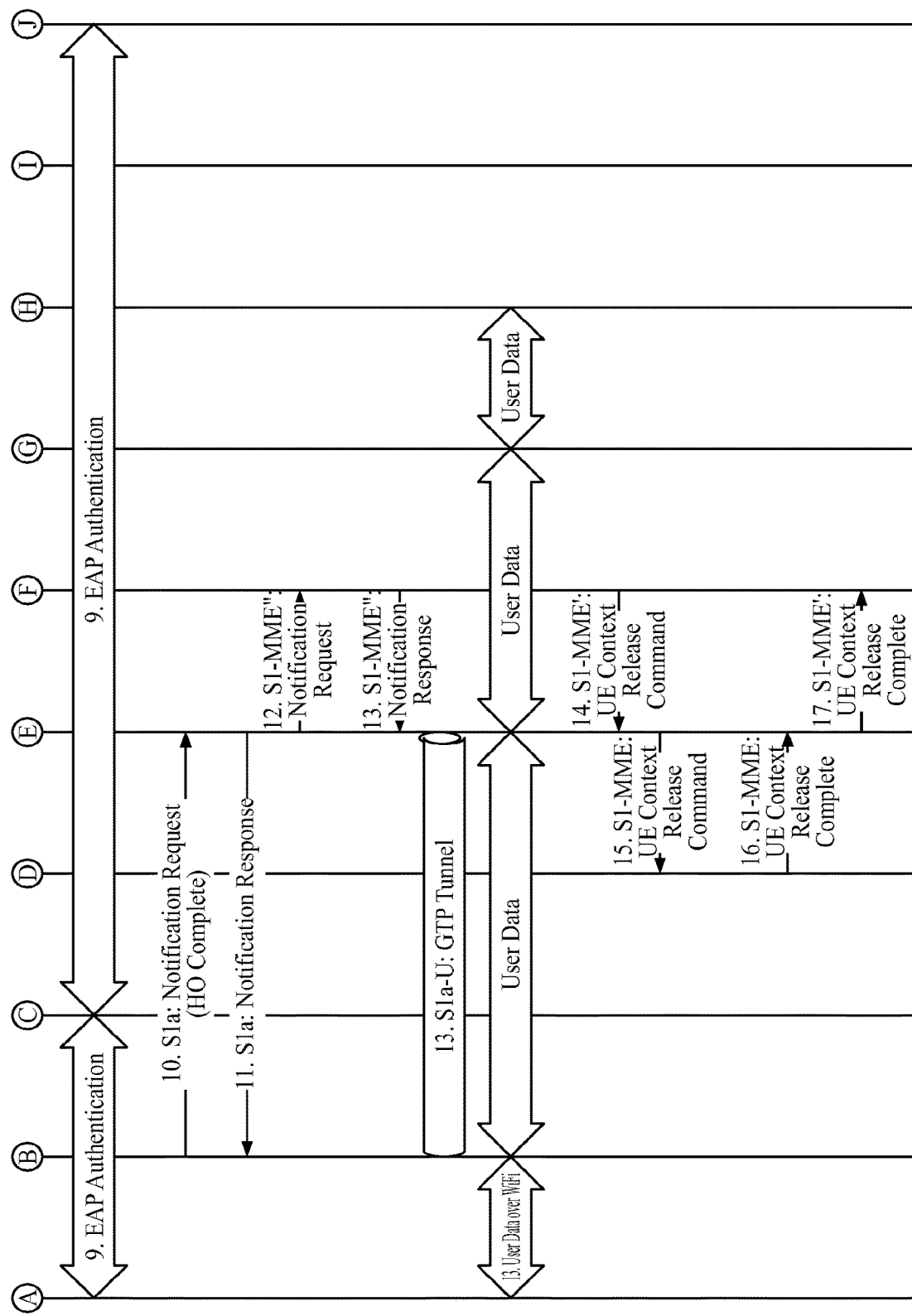

FIGS. 17A-B depict a flow diagram depicting example processing associated with an ISW GW 690 initiated handover from an existing HeNB 630 connection to Trusted WLAN 612 connection.

Referring to FIG. 17A, at step 0, it is illustrated that an ongoing session has been established over EPS/E-UTRAN access. It is assumed that an LTE data radio bearer already exists between the UE 662 and the HeNB 630. Moreover, three GTP-U user data tunnel exist, namely, HeNB 630 to/from ISW-GW 690, ISW-GW 690 to/from SGW 638, and SGW 638 to/from PGW 622.

At step 1 of FIG. 17A, the HeNB 630 receives a "RRC: Inter-system Measurement Reports" message from the UE 662. The message is similar to that described above in connection with step 1 of FIG. 9A.

At step 2, the HeNB 630 forwards the measurement reports to the ISW-GW 690 by communicating the message "eNB Direct Information Transfer ("Measurement Reports")" over the S1-MME interface 632. The message contains the same measurements information communicated by the UE 662 to the HeNB 630.

At step 3, based on the measurement reports collected from the LTE and WiFi sides and policies that have been configured via OAM, the ISW-GW 690 determines either to handover to the WiFi connection or to continue use the LTE air interface. The processing focuses on ISW-GW-initiated handover. In the example scenario depicted in FIG. 17, the MME 634 determines to have a lossless handover to WiFi.

At step 4, the ISW-GW 690 communicates a handover request to the TWAN 612 by transmitting a "Notification Request" message to the WLAN AN 610 over the newly proposed S1a interface 692. The message may comprise, for example, a hand over (HO) request, an ISW-GW address, an ISW-GW TEID, a P-GW ID, and an APN. The message contains the TEID and the address of the ISW-GW 690 so as to be available for use by the WLAN AN 610 for uplink data transmission.

At step 5, in response, the WLAN AN 610 generates and transmits a "Notification Response" message to the ISW-GW 690 over the newly proposed S1a interface 692 indicating the status of the HO. The message may comprise, for example, an HO status, a WLAN AN address, and a WLAN AN TEID. In most scenarios, the HO status is a "success" status, unless the particular WLAN AN is not admitting any additional UEs.

At step 6, the ISW-GW 690 communicates a "Handover Command" message to the HeNB 630.

At step 7, the HeNB 630 communicates the "Mobility from E-UTRA" message to the UE 662. The message is perceived by the UE 662 as a "Handover Command" message.

Similar to the processing described above in connection with FIG. 9, the UE 662 may be programmed to generate one or more user interfaces similar to those depicted in FIGS. 10A and 10B providing notice of an impending switch of access networks or requesting authorization for performing the switch. The user interfaces with interface to acknowledge the switch and/or to authorize the switch.

At step 8 of FIG. 17A, the UE 662 obtains an IPv4 address to be used for WLCP transport. It is assumed that, to identify the UE 662, the L3 attach request is transported in an L2 frame that contains the UE L2 address (MAC address) as described in 3GPP 23.402.

Referring to FIG. 17B, at step 9, the UE 662 discovers the trusted WLAN 612 and performs access authentication and authorization. The WLAN identity (SSIS, BSSID, etc.) may be provided by the MME 634 in the HO Command.

At step 10 of FIG. 17B, the WLAN AN 610 communicates a "Notification Request" message (HO complete) to the ISW-GW 690 over the newly proposed S1a interface 692. The message provides an indication of the completeness of the handover procedure, and also indicates that the UE 662 is now connected to the WLAN AN 610.

At step 11, the ISW-GW 690 responds by sending a "Notification Response" message to the WLAN AN 610 over the newly proposed S1a interface 692 to acknowledge receiving the notification message.

At step 12, the ISW-GW 690 communicates to the MME 634 the handover decision by forwarding the "Notification Request" message to the MME 634 over the newly proposed S1-MME' interface 635.

At step 13, the MME 634 responds by communicating the "Notification Response" message to the ISW-GW 690 over the newly proposed S1-MME' interface 635 to acknowledge receiving the notification message. At this point in the processing, the S1a-U GTP-based user data tunnel has been established. Data can be sent over the new WiFi path.

At step 14, the MME 634 releases the UE context in the HeNB 630 by communicating a "UE Context Release Command" message to the ISW-GW 690.

At step 15, the ISW-GW 690 forwards the "UE Context Release Command" message to the HeNB 630.

At step 16, the HeNB 630 releases its bearer resources related to the UE 662 and responds with a "UE context Release Complete" message to the ISW-GW 690.

At step 17, the ISW-GW 690 forwards the "UE context Release Complete" message to the MME 634.

ISW-GW-initiated Handover from Trusted WLAN to HeNB

In some instances, it may be desired to handover an existing data flow between a UE and a PDN via a WLAN, to be handed over to a new connection path via an HeNB connection. The ISW GW 690 is adapted to initiate a bearer handover scenario from the TWAN 612 to the HeNB 630. The ISW GW 690 receives measurement and performance statistics for both WiFi and LTE existing connections and determines whether it is best to utilize the LTE or WiFi. There is no need to involve any of the core network entities (e.g. MME 634) in making the handover decision. The ISW-GW 690 operates as the local inter-system mobility anchor.

Figure 18A:
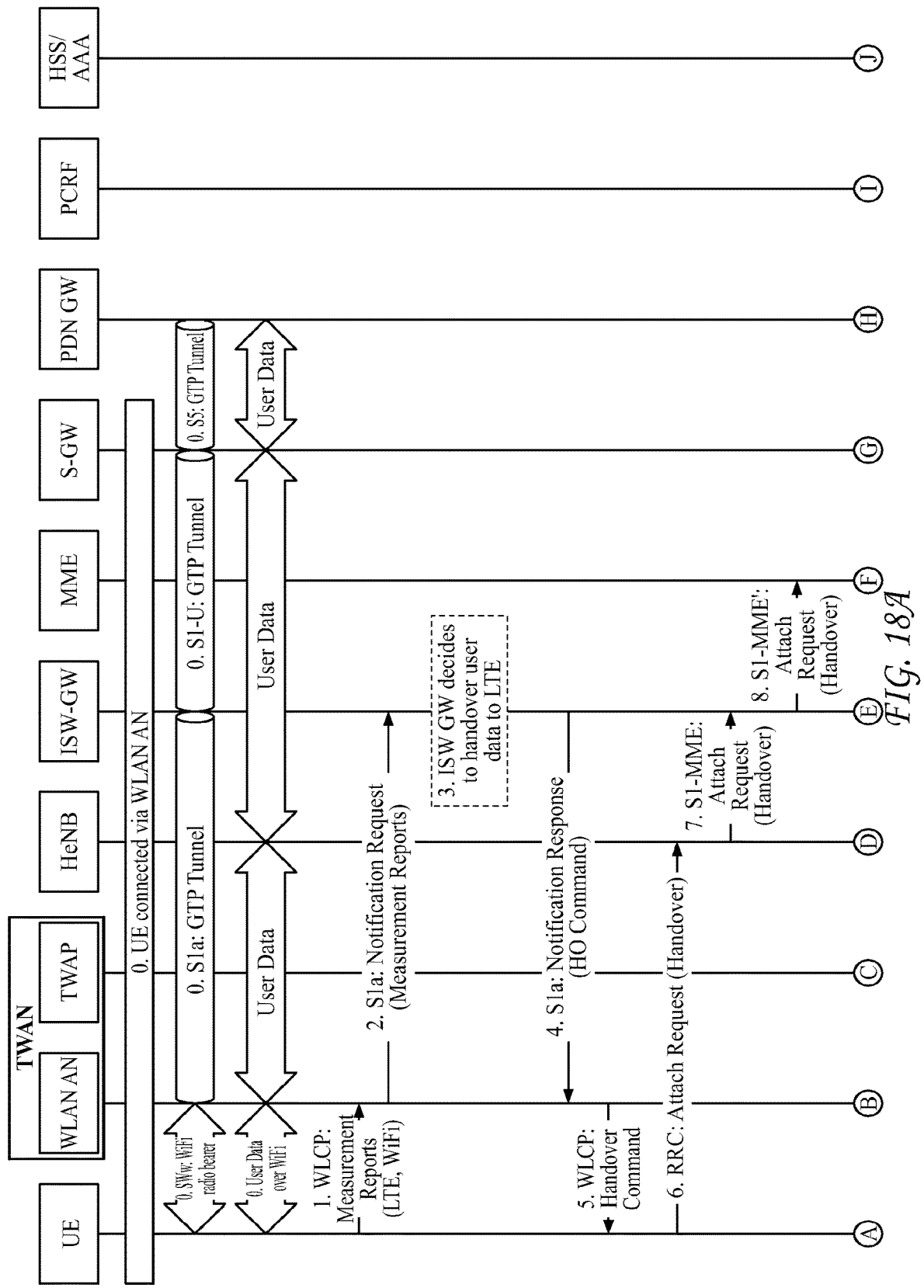
FIGS. 18A-B depict a diagram depicting example processing associated with a handover of a connection from a TWAN to an HeNB/LTE network.
Figure 18B:
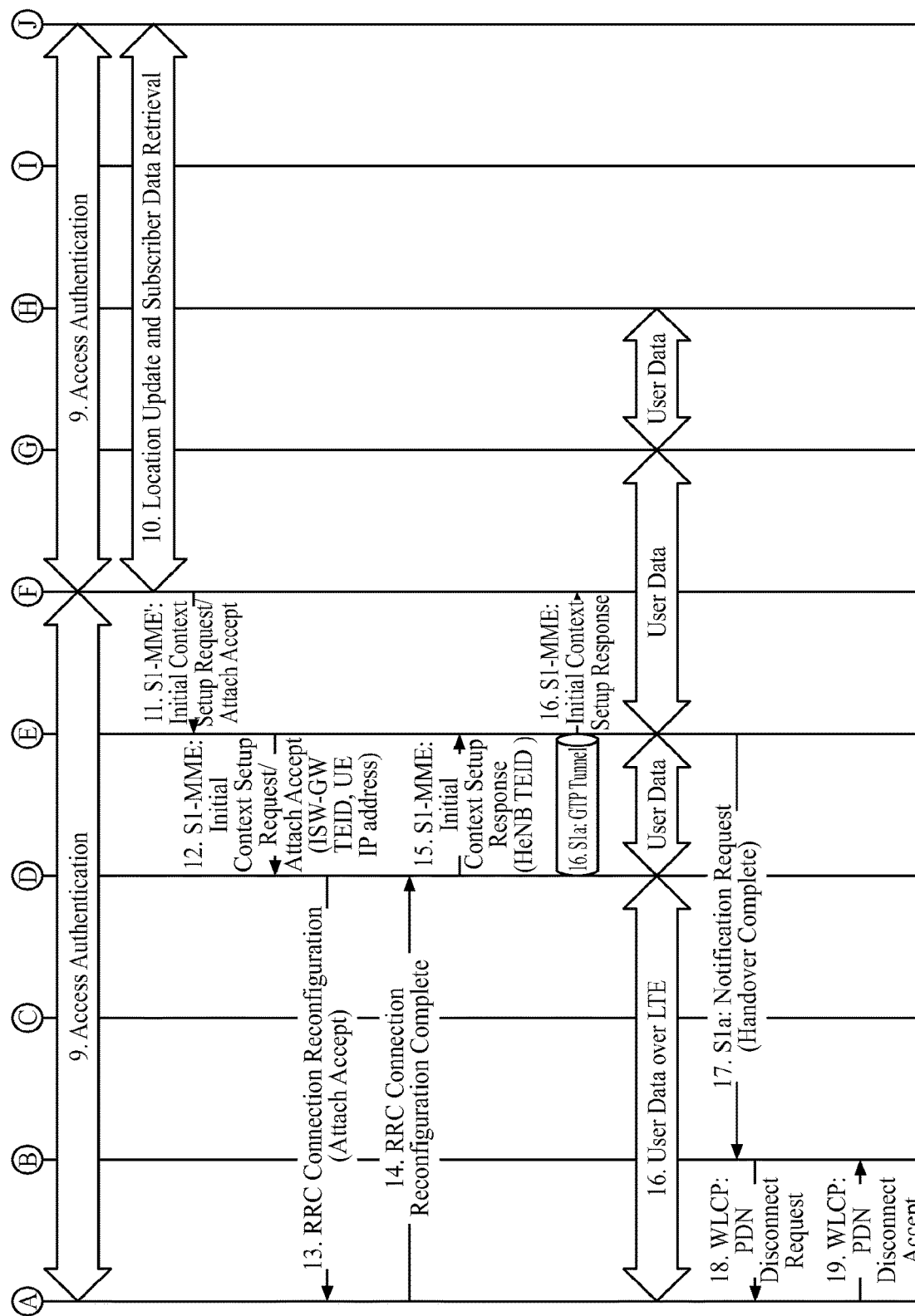

FIGS. 18A-B depicts a flow diagram depicting example processing associated with an ISW GW 690 initiated handover from an existing Trusted WLAN 612 connection to an HeNB 630 connection. Referring to FIG. 18A, at step 0, the diagram acknowledges that an ongoing session has been established over trusted WiFi access. It is assumed that a WiFi over the air transmission already exists between the UE 662 and the WLAN AN 610. Moreover, three GTP-U user data tunnels exist, namely, WLAN AN 610 to/from ISW-GW 638, ISW-GW 690 to/from SGW 630, and SGW 638 to/from PGW 622.

At step 1 of FIG. 18A, the UE 662 communicates WiFi measurements, which may comprise the measurements listed above in Table 2, along with the LTE neighbor list measurements to the WLAN AN 610. The information may be communicated using a newly defined message which may be referred to as "Measurement Reports." The message may be incorporated into the WLCP protocol.

At step 2, the WLAN AN 610 communicates the measurement reports to the ISW-GW 690 using the "Notification Request" message over the newly proposed S1a interface 692. This message may comprise the same measurements information sent by the UE 662 to the WLAN AN 610.

At step 3, based on the measurement reports collected from the WiFi and LTE sides, the ISW-GW 690 determines whether or not to handover to LTE or to continue using the WiFi air interface.

At step 4, the ISW-GW 690 communicates a "Notification Response" (or "Handover Command") message to the WLAN AN 610.

At step 5, the WLAN AN 610 forwards a newly defined "Handover Command" message to the UE 662 using the WLCP protocol. The message is an instruction to the UE 662 to start the attachment procedure with the HeNB 630.

Similar to the processing described above in connection with FIG. 9, the UE 662 may be programmed to generate one or more user interfaces similar to those depicted in FIGS. 10A and 10B providing notice of an impending switch of access networks or requesting authorization for performing the switch. The user interfaces with interface to acknowledge the switch and/or to authorize the switch.

At step 6, the UE 662 generates and communicates an "RRC: Attach Request" message to the HeNB 630. The message indicates that a handover is to take place.

At step 7, the HeNB 630 communicates the "Attach Request" message to the ISW-GW 690.

At step 8 of FIG. 18A, the ISW-GW 690 communicates the "Attach Request" message to the MME 634 via the newly defined S1-MME' interface 635.

Referring to FIG. 18B, at step 9, the MME 634 may contact the HSS 670 and authenticate the UE 662 as described in 3GPP TS 23.401, the contents of which are hereby incorporated herein in their entirety.

At step 10 of FIG. 18B, after successful authentication, the MME 634 may perform a location update procedure and retrieve subscriber data retrieval from the HSS 670 as specified in 3GPP TS 23.401.

At step 11, the MME 634 communicates an "Attach Accept" message to the ISW-GW 690, as in step 17 of the E-UTRAN initial attachment procedure described above in Section 5.3.2.1 of 3GPP TS 23.401, the contents of which are hereby incorporated herein by reference in its entirety. The message may be contained in an S1-MME control message "Initial Context Setup Request."

At step 12, the ISW-GW 690 communicates the "Attach Accept" message, received from the MME in step 7, to the HeNB 630. The message may comprise, for example, the TEID at the ISW-GW 690 used for user plane, as well as the address of the ISW-GW.

Steps 13-14 are similar to steps 18-19 of the E-UTRAN initial attachment procedure described in Section 5.3.2.1 of 3GPP TS 23.401.

At step 15, the HeNB 630 communicates the "Initial Context Setup Response" to the ISW-GW 690. The message may comprise, for example, the TEID of the HeNB 630 and the address of the HeNB used for downlink traffic on the S1-U interface.

At step 16, the ISW-GW 690 communicates the "Initial Context Setup Response" message to the MME 634 to indicate the handover procedure is complete. At this point in the processing, the GTP tunnel between the HeNB 630 and the ISW-GW 690 is established. Data may be exchanged between the UE 662 and the PGW 622 over the LTE air interface and through the HeNB 630, ISW-GW 690, and SGW 638.

At step 17, the ISW-GW 690 communicates a "Notification Request (Handover Complete)" message to the WLAN AN 610 to inform the WLAN AN 610 that the handover is complete.

At step 18, the WLAN AN 610 generates and transmits a "WLCP: PDN Disconnect Request" to the UE 662 to release the UE-TWAN connection.

At step 19, the UE 662 acknowledges the release by sending "WLCP: PDN Disconnect Accept" message to the WLAN AN 610.

Example Computing Environment

Figure 19A:
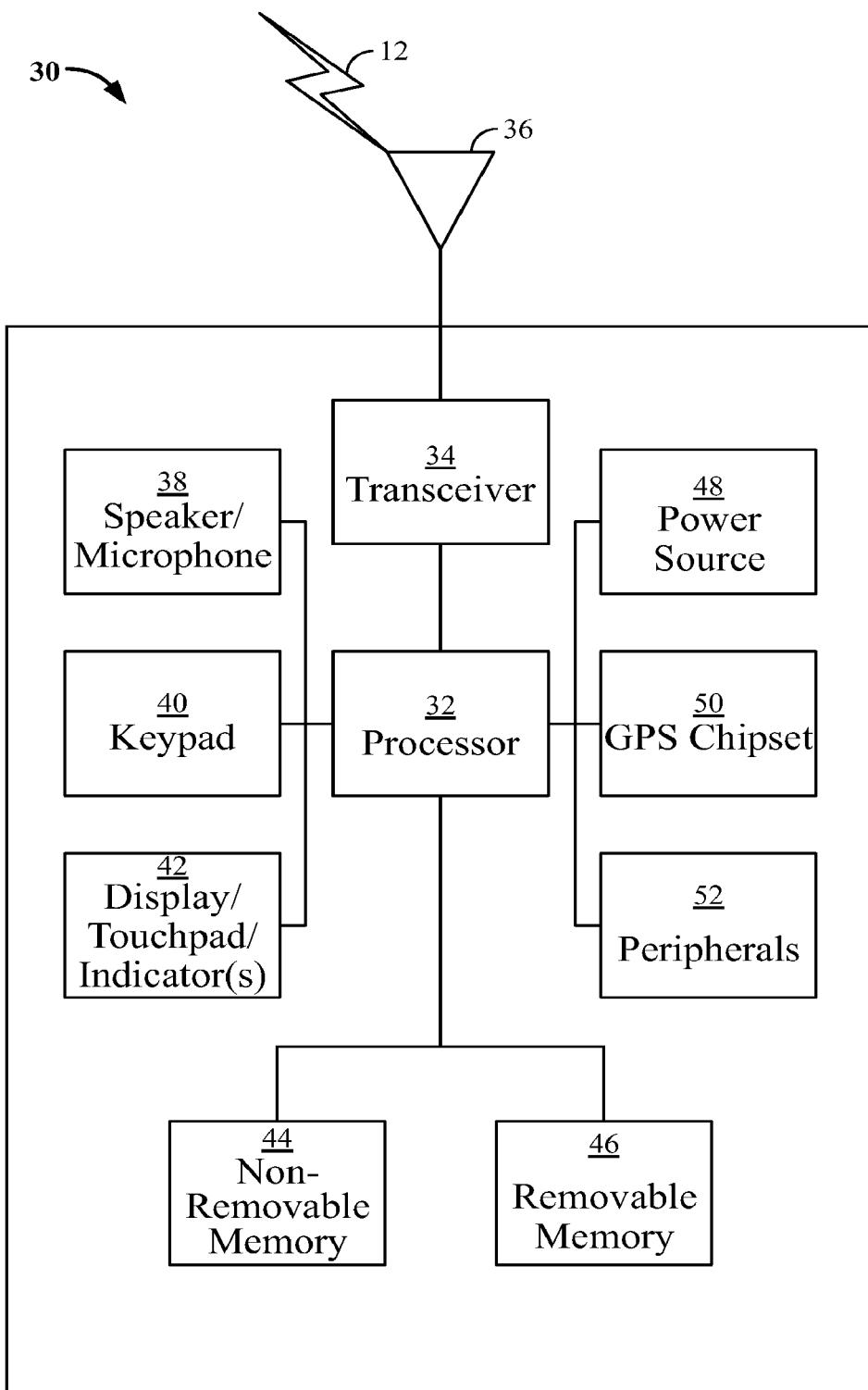
FIG. 19A is a system diagram of an example UE with which one or more disclosed embodiments may be implemented.

FIG. 19A is a system diagram of an example wireless communications device 30, such as, for example, a UE (562, 662) or a wireless base station such as may be used to implement HeNB network (595, 630) or WLAN AN (510, 610). As shown in FIG. 19A, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicators that operate as part of a user interface. It will be appreciated that the device 30 may include any sub-combination of the foregoing elements while remaining consistent with an embodiment. The device 30 of FIG. 19A may be a device that uses the serving gateway extensions for inter-system mobility systems and methods as discussed above.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 19A depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an eNode-B, Home eNode-B, WiFi access point, etc. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 19A as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 19B:
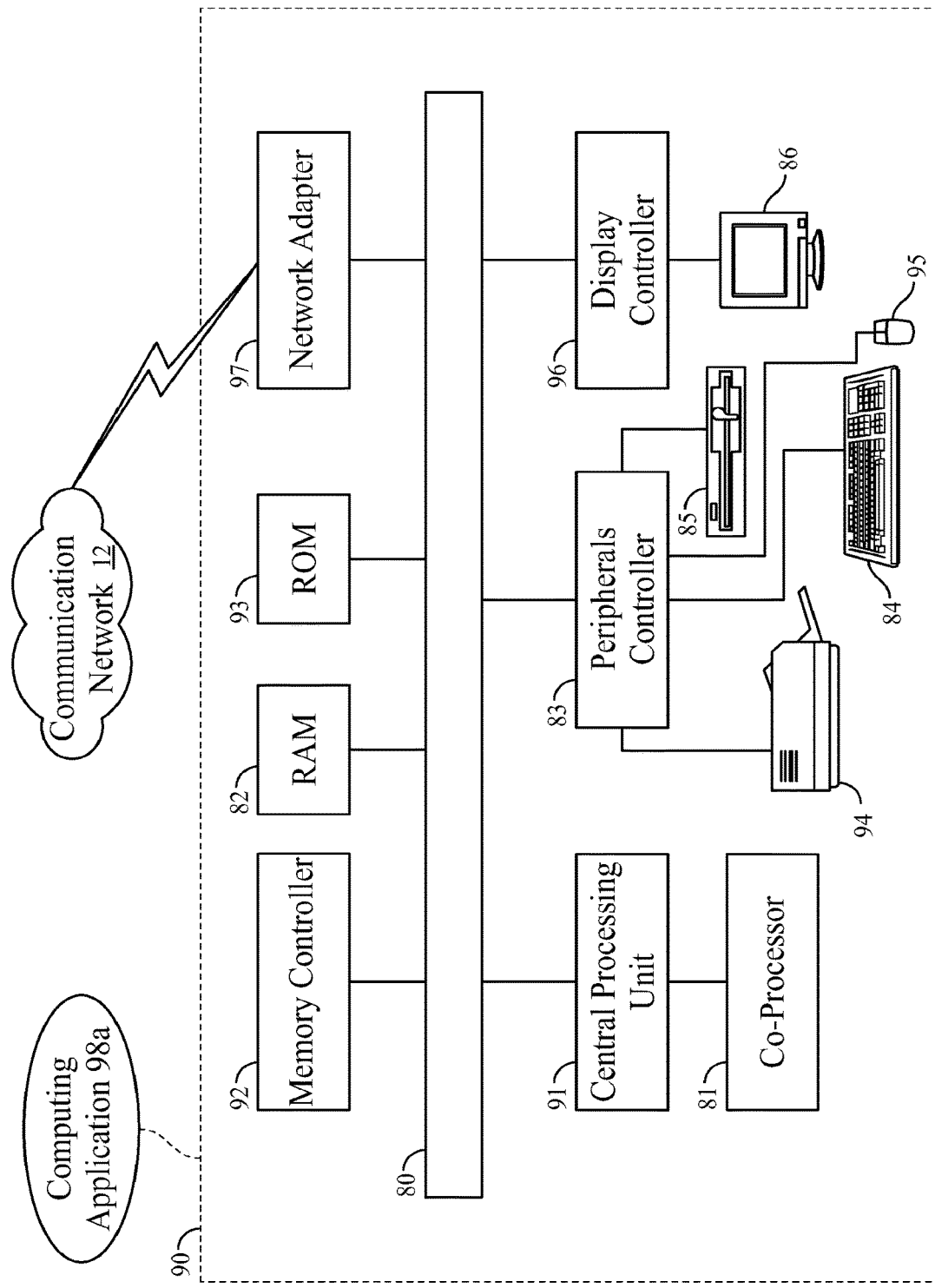
FIG. 19B is a system diagram of an example computing system that may be used to implement the systems and methods described herein.

FIG. 19B depicts a block diagram of an exemplary computing system 90 that may be used to implement the systems and methods described herein. For example, the computing system 1000 may be used to implement devices that operate as, for example, ISW GW 690, MME (534, 634), SGW (538, 638), WLAN (510, 610), TWAP (564, 664), PGW (522, 622), and 3GPP AAA server (518, 618) such as referenced herein. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed inter-system mobility systems and methods as disclosed above including, for example, that discussed in connection with ISW GW 290, MME 234, SGW 238, WLAN 210, TWAP 260, PGW 222, and 3GPP AAA server 218.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as PDNs. In an embodiment, network adaptor 97 may receive and transmit data related to the disclosed serving gateway extensions for inter-system mobility systems and methods.

Accordingly, applicants have disclosed improved systems and methods for network-initiated handover in an integrated small cell and WiFi network. An inter-system mobility anchor control point, which may be, for example, an MME or ISW GW, is adapted to initiate handover of an existing communication connection in an integrated small cell and WiFi (ISW) network. The inter-system mobility anchor control point is communicatively coupled to both an HeNB/LTE network and trusted WLAN access network (TWAN) and adapted to operate as a common control plane entity for both HeNB/LTE and TWAN access. The mobility anchor control point is adapted to request and receive measurement data relating to the operations of the HeNB network and WLAN. Based upon the measurement data, the mobility anchor control point determines whether an existing communication path via one of the HeNB/LTE network and WLAN should be handed over to the other of the networks. Upon determining a handover should be made, the mobility anchor control point coordinates the handover.

The disclosed systems and methods may result in various benefits. For example, communication performance is improved by enabling execution of inter-system mobility procedures, including decisions regarding handover of data flows, close to the edge of the network. Communication latency is reduced by minimizing the need for signaling procedures deep in the core network, i.e., toward the PGW. This can be especially beneficial when an MNO deploys both small cell and WiFi access in a common geographic area. Scalability is also improved by reducing the PGW processing burden, e.g., by distributing some inter-system mobility functions to the MME and SGW.

Furthermore, the disclosed systems and methods provide efficiency in performing hand over operations. According to existing processing methods, during inter-system handover, the PGW tears down all of the old GTP-based tunnels between the UE and the PGW and establishes entirely new tunnels, even though some of the sub-tunnels are simply recreated when the data flow is handed over to the new connection. According to the systems and methods disclosed herein, only those portions of the GTP-based tunnels that will not be used after the handover are taken down. Accordingly, the processing is more efficient and the administrative burdens placed on the system lessened.

Yet another benefit of the disclosed systems and methods is the improved control and decision making resulting from initiating handovers from the network as opposed by the UE. The UE does not have information about network conditions such as, for example, the load levels and congestion, on the HeNB network and TWAN. In the disclosed systems, the MME and ISW GW may retrieve information about the network conditions and make informed decisions regarding handovers.

It will be appreciated that while illustrative embodiments have been disclosed, the scope of potential embodiments is not limited to those explicitly set out. For example, while the system has been described with primary reference to "Trusted" WLAN Access Networks (TWAN), the envisioned embodiments extend as well to embodiments that employ "Untrusted" WLANs. Indeed, embodiments may employ any suitable wireless local access network. Moreover, it will be appreciated that the disclosed embodiments are not limited to the particular protocols and message formats that are disclosed herein, but rather, may employ any suitable protocol and formatting. Still further, while the disclosed embodiments make reference to the ISW GW and MME, it will be appreciated that the functionality associated with the ISW GW and MME may be incorporated into another component such as, for example, an HeNB GW, and still fall within the scope of intended embodiments.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

The following is a list of acronyms relating to service level technologies that may appear in the above description.

| | |
|---|---|
| AAA | Authentication, Authorization, and Accounting |
| ANDSF | Access Network Discovery and Selection Function |
| ANQP | Access Network Query Protocol |
| AP | Access Point |
| APN | Access Point Name |
| CAPWAP | Control and Provisioning of Wireless Access Points |
| DHCP | Dynamic Host Configuration Protocol |
| EAP | Extensible Authentication Protocol |
| EAP-AKA | EAP Authentication and Key Agreement |
| EAP-AKA' | EAP AKA "prime" |
| EAPoL | EAP over LAN |
| EPC | Evolved Packet Core |
| ePDG | Evolved Packet Data Gateway |
| GPRS | General Packet Radio Service |
| GTP | GPRS Tunneling Protocol |
| HeNB | Home evolved Node B |
| HRPD | High Rate Packet Data |
| HS GW | HRPD Serving Gateway |
| HSS | Home Subscriber Server |
| IETF | Internet Engineering Task Force |
| IKEv2 | Internet Key Exchange Protocol Version 2 |
| IMSI | International Mobile Subscriber Identity |
| IP | Internet Protocol |
| ISW | Integrated Small-cell and WiFi |
| ISWN | Integrated Small-cell and WiFi Networks |
| LTE | Long Term Evolution |
| MAC | Medium Access Control |
| MAPCON | Multi Access PDN Connectivity |
| MCN | Mobile Core Network |
| MME | Mobility Management Entity |
| MNO | Mobile Network Operator |
| NAS | Non Access Stratum |
| OAM | Operations, Administration, and Maintenance |
| PCRF | Policy and Charging Rules Function |
| PDN | Packet Data Network |
| PGW | PDN Gateway |
| PMIP | Proxy Mobile IP |
| QoE | Quality of Experience |
| QoS | Quality of Service |
| RAT | Radio Access Technology |
| RRC | Radio Resource Control |
| SaMOG | S2a Mobility Over GTP |
| SCF | Small Cell Forum |
| SCTP | Stream Control Transmission Protocol |
| SGW | Serving Gateway |
| SI | Study Item (3GPP) |
| SNMP | Simple Network Management Protocol |
| TEID | Tunneling Endpoint Identifier |
| TWAG | Trusted WLAN Access Gateway |
| TWAN | Trusted WLAN Access Network |
| TWAP | Trusted WLAN AAA Proxy |
| UDP | User Datagram Protocol |
| UE | User Equipment |
| USIM | UMTS Subscriber Identity Module |
| WBA | Wireless Broadband Alliance |
| WFA | WiFi Alliance |
| WLAN | Wireless Local Area Network |
| WLC | Wireless LAN Controller |
| WLCP | Wireless LAN Control Protocol |

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for a network system, comprising:
receiving control plane signaling from a mobility management entity (MME) of a core network via a control plane interface between an apparatus and the MME, wherein the apparatus acts as a common control gateway and a user gateway for a trusted wireless local area network access network (TWAN) and a cellular communication access network;
receiving user plane signaling from a serving gateway (SGW) of the core network via a user plane interface between the apparatus and the SGW, the control plane signaling and user plane signaling associated with a user equipment, UE, when the user equipment is in a cell controlled by the cellular communication access network, the user equipment having an existing communication connection with a packet data network;
receiving measurement data, the measurement data transmitted by a user equipment and comprising inter-system measurements associated with one or more wireless local area networks whose received signal strength indicator (RSSI) exceeds a threshold;
based on the measurement data, determining to perform a handover of the user equipment to a wireless local area network (WLAN) associated with the TWAN;
communicating a handover request to the TWAN, the handover request comprising an address associated with the apparatus, a Tunnel Endpoint ID (TEID) associated with the apparatus, a packet gateway (PGW) ID, or an access point name (APN);
receiving a response to the handover request from the TWAN, the response comprising a status of the handover, and address associated with the WLAN, or a TEID associated with the WLAN;
generating a handover command message for transmission to the user equipment instructing the user equipment to perform the handover to the WLAN;
receiving, from the TWAN, an indication that the handover has been completed;
transmitting to the core network an indication of the completion of the handover of the user equipment; and
receiving, from the core network, control plane signaling from the MME, and user plane signaling from the SGW.

2. The method of claim 1, wherein:
the existing communication connection between the user equipment and the packet data network, comprises an internet protocol (IP) connection between the user equipment and the PGW of the core network, and
the IP connection is maintained after the handover.

3. A computer readable storage medium storing computer executable instructions that when executed by a computing device cause said computing device to effectuate operations comprising:
receiving control plane signaling from a mobility management entity (MME) of a core network via a control plane interface between an apparatus and the MME, wherein the apparatus acts as a common control gateway and a user gateway for a trusted wireless local area network access network (TWAN) and a cellular communication access network;
receiving user plane signaling from a serving gateway (SGW) of the core network via a user plane interface between the apparatus and the SGW, the control plane signaling and user plane signaling associated with a user equipment, UE, when the user equipment is in a cell controlled by the cellular communication access network, the user equipment having an existing communication connection with a packet data network;
receiving measurement data, the measurement data transmitted by a user equipment and comprising inter-system measurements associated with one or more wireless local area networks whose received signal strength indicator (RSSI) exceeds a threshold;

based on the measurement data, determining to perform a handover of the user equipment to a wireless local area network (WLAN) associated with the TWAN;

communicating a handover request to the TWAN, the handover request comprising an address associated with the apparatus, a Tunnel Endpoint ID (TEID) associated with the apparatus, a packet gateway (PGW) ID, or an access point name (APN);

receiving a response to the handover request from the TWAN, the response comprising a status of the handover, and address associated with the WLAN, or a TEID associated with the WLAN;

generating a handover command message for transmission to the user equipment instructing the user equipment to perform the handover to the WLAN;

receiving, from the TWAN, an indication that the handover has been completed;

transmitting to the core network an indication of the completion of the handover of the user equipment; and receiving, from the core network, control plane signaling from the MME, and user plane signaling from the SGW.

4. The computer readable storage medium of claim 3, wherein:

the existing communication connection between the user equipment and the packet data network, comprises an internet protocol (IP) connection between the user equipment and the PGW of the core network, and the IP connection is maintained after the handover.

5. An apparatus for connecting a trusted wireless local area network (WLAN) access network (TWAN), to a core network of a wireless communications network to allow a user equipment to access the capabilities of a packet data network (PDN) through a cellular communication access network or the TWAN, and to allow an existing communication connection between the user equipment and the PDN to be handed over from the cellular communication access network or the TWAN to the other, the apparatus acting as a common control gateway and user gateway for the TWAN and the cellular communication access network, the apparatus comprising:

a processor; and memory coupled with the processor, the memory storing executable instructions that when executed by the processor cause the processor to effectuate operations comprising:

receiving from the core network control plane signaling from a mobility management entity (MME) of the core network via a control plane interface between the apparatus and the MME and user plane signaling from a serving gateway (SGW) of the core network via a user plane interface between the apparatus and the SGW, the control plane signaling and user plane signaling associated with the user equipment when the user equipment is in a cell controlled by the cellular communication access network;

receiving a measurement report, the measurement report transmitted in the cell by the user equipment and comprising inter-system measurements associated with one or more wireless local area networks whose received signal strength indicator (RSSI) exceeds a threshold;

based on the measurement report, determining to perform a handover of the user equipment to a wireless local area network associated with the TWAN;

transmitting a handover request to the TWAN via an interface between the apparatus and the WLAN supporting both user plane and control plane communication, the handover request comprising an address associated with the apparatus, a tunnel endpoint identifier (TEID) associated with the apparatus, a packet gateway (PGW) ID, or an access point name (APN);

receiving a response to the handover request from the TWAN via the interface between the apparatus and the WLAN which supports both user plane and control plane communication, the response comprising a status of the handover, an address associated with the wireless local area network, or a TEID associated with the WLAN;

generating a handover command message for transmission to the user equipment instructing the user equipment to perform the handover to the wireless local area network, receiving from the TWAN an indication that the handover has been completed via the interface between the apparatus and the WLAN which supports both user plane and control plane communications;

transmitting to the core network an indication of the completion of the handover of the user equipment from the cell to the wireless local area network via the control plane interface between the apparatus and the MME; and receiving, from the core network, control plane signaling from the MME via the control plane interface between the apparatus and the MME, and user plane signaling from the SGW via the user plane interface between the apparatus and the SGW associated with the user equipment when the user equipment is in the wireless local area network.

6. The apparatus of claim 5, wherein:

the existing communication between the existing communication connection between the user equipment and the PDN comprises an internet protocol (IP) connection between the user equipment and the PGW of the core network, and the IP connection is maintained after the handover.

* * * * *